(12) United States Patent
Ergun

(10) Patent No.: US 8,612,501 B2
(45) Date of Patent: Dec. 17, 2013

(54) METHOD AND HARDWARE FOR GENERATING RANDOM NUMBERS USING DUAL OSCILLATOR ARCHITECTURE AND CONTINUOUS-TIME CHAOS

(75) Inventor: Salih Ergun, Ankara (TR)

(73) Assignee: Scientific Technological Research Council of Turkey (Tubitak), Kavaklidere (TR)

( * ) Notice: Subject to any disclaimer, the term of this patent is extended or adjusted under 35 U.S.C. 154(b) by 1059 days.

(21) Appl. No.: 12/601,453

(22) PCT Filed: May 22, 2007

(86) PCT No.: PCT/IB2007/051938
§ 371 (c)(1),
(2), (4) Date: Nov. 23, 2009

(87) PCT Pub. No.: WO2008/142488
PCT Pub. Date: Nov. 27, 2008

(65) Prior Publication Data
US 2010/0146025 A1    Jun. 10, 2010

(51) Int. Cl.
G06F 7/58    (2006.01)
(52) U.S. Cl.
USPC .......................................... 708/251
(58) Field of Classification Search
None
See application file for complete search history.

(56) References Cited

U.S. PATENT DOCUMENTS

| | | | |
|---|---|---|---|
| 4,545,024 A | 10/1985 | Maher et al. | |
| 7,117,233 B2 * | 10/2006 | Dichtl | 708/250 |
| 7,188,131 B2 * | 3/2007 | Bardouillet | 708/251 |
| 8,131,789 B2 * | 3/2012 | Vergnes et al. | 708/251 |
| 2003/0067336 A1 | 4/2003 | Cruz-Albrecht | |
| 2003/0208517 A1 * | 11/2003 | Takagi | 708/251 |
| 2004/0010526 A1 * | 1/2004 | Dichtl | 708/251 |
| 2004/0107230 A1 * | 6/2004 | Bardouillet | 708/252 |
| 2006/0155551 A1 | 7/2006 | Ueda | |
| 2009/0327380 A1 * | 12/2009 | Cho | 708/251 |
| 2010/0005123 A1 * | 1/2010 | Norrgard et al. | 707/202 |
| 2010/0146025 A1 * | 6/2010 | Ergun | 708/251 |

* cited by examiner

Primary Examiner — David H Malzahn
(74) Attorney, Agent, or Firm — Arent Fox LLP

(57) ABSTRACT

Novel random number generation methods and novel random number generators based on continuous-time chaotic oscillators with dual oscillator architecture are presented. Numerical and experimental results not only verify the feasibility of the proposed circuits, but also encourage their use as a high-performance IC TRNG. In comparison with RNG's based on discrete-time chaotic maps, amplification of a noise source and jittered oscillator sampling, which are advantageous in the sense that true random behavior can be mathematically proven thanks to an analytical model that has been developed, it is seen that RNG's based on continuous-time' chaotic oscillators can offer much higher and constant data rated without post-processing. The proposed innovation increases the throughput, maximizes the statistical quality of the output sequence and is robust against external interference, parameter variations and attacks aimed to force throughout. The proposed circuits can be integrated on today process at GHz range.

6 Claims, 14 Drawing Sheets

METHOD AND HARDWARE FOR GENERATING RANDOM NUMBERS USING DUAL OSCILLATOR ARCHITECTURE AND CONTINUOUS-TIME CHAOS

CROSS-REFERENCE TO RELATED APPLICATION

This application is a National Stage entry of International Application No. PCT/IB2007/051938, filed May 22, 2007, the disclosure of the prior application is incorporated in its entirety by reference.

BACKGROUND OF THE INVENTION

In the last decade, the increasing demand of electronic official and financial transactions, the use of digital signature applications and the requirements of information secrecy have made the random number generators (RNGs) more popular. With this respect, RNGs, which have been generally used for military cryptographic applications in the past, have now an important role in design of a typical digital communication equipment.

Almost all cryptographic systems require unpredictable values, therefore RNG is a fundamental component for cryptographic mechanisms. Generation of public/private key-pairs for asymmetric algorithms and keys for symmetric and hybrid crypto systems require random numbers. The one-time pad, challenges, nonces, padding bytes and blinding values are created by using truly random number generators (TRNGs). Pseudo-random number generators (PRNGs) generate bits in a deterministic manner. In order to appear to be generated by a TRNG, the pseudo-random sequences must be seeded from a shorter truly random sequence. RNGs are also used in many areas including Monte Carlo analysis, computer simulations, statistical sampling, stochastic optimization methods, watermarking for image authentication, authentication procedure between two crypto equipments and initial value randomization of a crypto module that realizes an algorithm.

Even if RNG design is known, any useful prediction about the output can not be made. To fulfill the requirements for secrecy of one-time pad, key generation and any other cryptographic applications, the TRNG must satisfy the following properties: The output bit stream of the TRNG must pass all the statistical tests of randomness; the next random bit must be unpredictable; the same output bit stream of the TRNG must not be able to reproduced. The best way to generate true random numbers is to exploit the natural randomness of the real world by finding a random event that happens regularly. Examples of such usable event include elapsed time during radioactive decay, thermal and shot noise, oscillator jitter and the amount of charge of a semiconductor capacitor.

There are few RNG designs reported in the literature; however fundamentally four different techniques were mentioned for generating random numbers: amplification of a noise source dual oscillator architecture, discrete-time chaotic maps and continuous-time chaotic oscillators. In spite of the fact that, the use of discrete-time chaotic maps in the realization of RNG is well-known for some time, it was only recently shown that continuous-time chaotic oscillators can be used to realize TRNGs also. Following up in this direction, we investigated the usefulness of the proposed innovation to generate random binary data from continuous-time chaotic oscillators with dual oscillator architecture.

The bit rates of RNGs commonly found in literature and commercial products became insufficient because of the increasing data rates of digital communication equipments. In comparison with RNGs based on discrete-time chaotic maps, amplification of a noise source and jittered oscillator sampling, it is seen that RNGs based on continuous-time chaotic oscillators can offer much higher and constant data rates without post-processing with less complex integrated circuits. In conclusion, we can deduce that continuous-time chaotic oscillators can be integrated on today's process at GHz range and the use of continuous-time chaos with the proposed innovation is very promising in generating random numbers with very high throughput.

In order to be compatible with other system elements, it is preferable to use chaotic oscillators that can be integrated on silicon. A number of attempts have been made to introduce discrete time as well as continuous-time CMOS chaotic oscillators. In most of these attempts, the resulting circuits were complicated and occupied a large silicon area. Discrete-time chaotic oscillators usually employ either switched-C or switched-current techniques. The utilization of a multiplier in addition to the many capacitors and op amps automatically result in a large circuit. In comparison with RNGs based on discrete-time chaotic sources it is seen that RNGs based on continuous-time chaotic sources can offer much higher data rates with less complex and less noisy integrated circuits, particularly due to the absence of successive sample-and-hold stages.

Amplification of a noise source technique shown in FIG. 1, uses a high-gain high-bandwidth amplifier to process the white noise which has small ac voltage. The noise must be amplified to a level where it can be accurately thresholded with no bias by a clocked comparator. This is the most popular RNG technique for single-chip or boardlevel solutions.

In low voltage CMOS integrated circuits, two different noise mechanisms generate wideband white noise: shot noise (generated by current flow across a p-n junction) and thermal noise (generated by random electron motion in a resistor). Avalanche noise is not a practical choice for a noise source because of the typical high breakdown voltage (>6V DC) of Lever diodes fabricated in bulk CMOS processes. As shown in FIG. 1, the integrated noise source topology uses a large resistor as a thermal noise generator. Resistors are easily fabricated from polysilicon or diffusion layers and require no bias current to generate noise, as semiconductor junctions do. A polysilicon resistor also has a low flicker noise index (typically −30 dB), ensuring low 1/f noise levels.

Assuming negligible 1/f noise, the thermal noise voltage of the source resistor $R_{S_{TC}}$ will be $E_t = \sqrt{4kTR_{S_{TC}}\Delta f}$ where k is Boltzmann's constant, T is absolute temperature, $R_{S_{TC}}$ is the resistance, and $\Delta f$ is the noise bandwidth. The noise bandwidth of $E_t$ is normally limited by the first-order low pass filter formed by $R_{S_{TC}}$ and the equivalent amplifier input capacitance $C_{Amp}$. Provided the −3 dB bandwidth of the amplifier is larger than the noise bandwidth, the total equivalent noise voltage $E_{ni}$ due to $E_t$ at the input of the amplifier will be $$E_{ni} = \sqrt{\frac{kT}{C_{Amp}}}$$

where it is the theoretical limit for thermal noise generated by a resistor shunted with a capacitor. Thermal noise voltage amplitude over a 1 Hz bandwidth can be increased by increasing the value of $R_{S_{TC}}$, but at the cost of reduced thermal noise bandwidth, such that $E_{ni}$ will remain constant for a given $C_{Amp}$.

The dual oscillator architecture uses a random source that is derived from two free-running oscillators, one fast and the other one slower as shown in FIG. 2. Published RNG designs using this technique report that typical levels of oscillator jitter are not nearly sufficient to produce statistical randomness. For this reason a noise source is used to modulate the frequency of the slower clock, and with the rising edge of the noise-modulated slower clock fast clock is sampled. Drift between the two clocks thus provides the source of random binary digits. Similarly to amplification of a noise source technique, the noise must be amplified to a level where it can be used to modulate the frequency of the slower clock. The slower clock frequency, which determines the throughput data rate, is basically limited by the bandwidth of the noise signal used for modulation where the main reason of the limitation is the bandwidth of the amplifier.

SUMMARY OF THE INVENTION

In the proposed innovation waveform of the chaotic oscillator, which is in the order of a few volts with a nominal center frequency in the GHz range, was exploited to modulate the frequency of the slower clock directly without using an amplifier, where the theoretical limit for the throughput data rate is basically determined by the nominal center frequency of the chaotic oscillator which results in the order of 100 Gbit/s. Such high data rates may render continuous-time RNGs attractive when compared to their counterparts based on the other techniques. Both an autonomous and a non-autonomous chaotic oscillator can be used as the core of the proposed RNG design.

The proposed innovation has been numerically verified to be capable of rates 700 times of magnitude higher. Additionally, compensation loop is not feasible for the previous design because of the reason that obtained bit sequence can pass the full test suite of Diehard thanks to Von Neumann processing.

By using chaotic oscillator with the dual oscillator architecture, the output throughput and the statistical quality of the generated bit sequences increase and the proposed design is robust against external interference, parameter variations and attacks aimed to force throughput. In this innovation the chaotic oscillator output signal is used to modulate the frequency of a slower clock. Then, with the rising edge of the chaos-modulated slower clock, fast clock is sampled. We have developed a numerical model for the proposed design and have finally verified both numerically and experimentally that the binary data obtained by this oscillator sampling technique, passed the tests used in both the FIPS-140-2 test suite and the full NIST random number test suite for a higher throughput speed when compared to previous RNG designs based on the other techniques.

Due to their extreme sensitivity to initial conditions and having a positive Lyapunov exponent and a noise-like power spectrum, chaotic systems lend themselves to be exploited for random number generation. In order to obtain random binary data from a continuous-time chaotic system, we have presented an interesting technique, which relies on generating a non-invertible binary data from the waveform of the given chaotic oscillator. It should be noted that non-invertibility is a key feature for generating PRNGs.

In the proposed innovation, to obtain binary random bits from an autonomous or a non-autonomous chaotic oscillator, we used dual oscillator architecture. In this design, the output of a fast oscillator is sampled on the rising edge of the chaos-modulated slower clock using a D flip-flop or a T flip-flop. A voltage-controlled oscillator (VCO) or a current-controlled oscillator (COO) is used to implement the modulation of the slower clock frequency with the chaotic signal which corresponds to one of the state $x_1, x_2, \ldots$ or $x_n$, which are the normalized quantities of the chaotic oscillator used as the core of the proposed RNG. Note that, although n-dimensional trajectories in the $x_1$-$x_2$-$\ldots$-$x_n$ plane is invertible, one may obtain a non-invertible section by considering only the values corresponding to one of the states, say $x_1$. Center frequency of the VCO (or CCO) determines the center frequency of the slower clock. Drift between the two oscillators provides random bit generation to be more robust. Because of the nonlinear aliasing phenomenon associated with sampling, the dual oscillator architecture achieves increased output throughput and higher statistical quality. In the previous designs, a noise source is converted into binary sequence by using a threshold, which is basically analog to digital conversion in two bit quanta. However dual oscillator architecture provides most of the frequency components of input signal to affect the output.

DETAILED DESCRIPTION OF THE INVENTION

Moreover, a numerical model for the proposed design has been developed allowing the estimation of the output bit entropy as a function of the design parameters. Assuming that VCO (or CCO) has a linear transfer function, frequency of the slower clock $f_{slow}$ can be calculated according to the given Equation 1:

$$f_{slow} = f_{slow\,center}\left(\frac{x_1}{2x_{1\,max}} + 1\right) \quad (1)$$

where $$\frac{f_{slow}}{2} < f_{slow} < \frac{3f_{slow}}{2}, \quad \text{for} \quad -x_{1max} < x_1 < x_{1max}.$$

Figure 1:
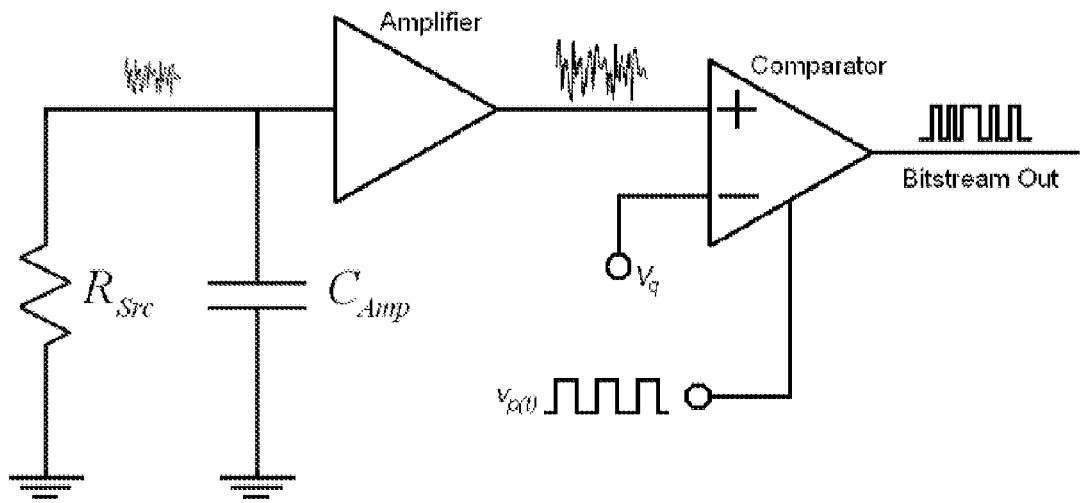
FIG. 1. Amplification of a noise source technique
FIG. 2. Classical dual oscillator architecture
FIG. 3. Fast and the slower clock output signals
FIG. 4. Approximate entropy of $S_{dual\ oscillator}$ sequence with respect to $f_{fast}/f_{slow\ center}$
FIG. 5. Random number generation using dual oscillator architecture and continuous-time chaos
FIG. 6. Chaos-modulated oscillator measure
FIG. 7. Random number generation using comparator based dual oscillator architecture and continuous-time chaos
FIG. 8. Approximate entropy of $S_{CDOA}$ sequence with respect $f_{fast}/f_{slow\ center}$
FIG. 9. Random number generation using comparator based dual oscillator architecture and noise
FIG. 10. Autonomous MOS chaotic oscillator
FIG. 11. Numerical analysis results of the chaotic oscillator
FIG. 12. Chaotic attractor from the post-layout circuit simulation
FIG. 13. Fast and the slower clock output signals
FIG. 14. Approximate entropy of $S_{dual\ oscillator}$ sequence with respect to $f_{fast}/f_{slow\ center}$
FIG. 15. Experimental results of the chaotic oscillator
FIG. 16. Chaos-modulated oscillator measure
FIG. 17. Results of the numerical analysis of the chaotic oscillator
FIG. 18. Circuit realization of the double-scroll attractor
FIG. 19. Experimental results of the chaotic oscillator
FIG. 20. Chaos-modulated oscillator measure
FIG. 21. Proposed bipolar oscillator
FIG. 22. Results of the numerical analysis of the bipolar oscillator
FIG. 23. Proposed CMOS oscillator
FIG. 24. Results of the numerical analysis of the CMOS oscillator
FIG. 25. Zeros of the Melnikov function calculated on the homoclinic orbit shown in the upper right corner
FIG. 26. Experimental results of the bipolar chaotic oscillator
FIG. 27. Experimental results of the CMOS chaotic oscillator
FIG. 28. Chaos-modulated oscillator measure
Figure 2:
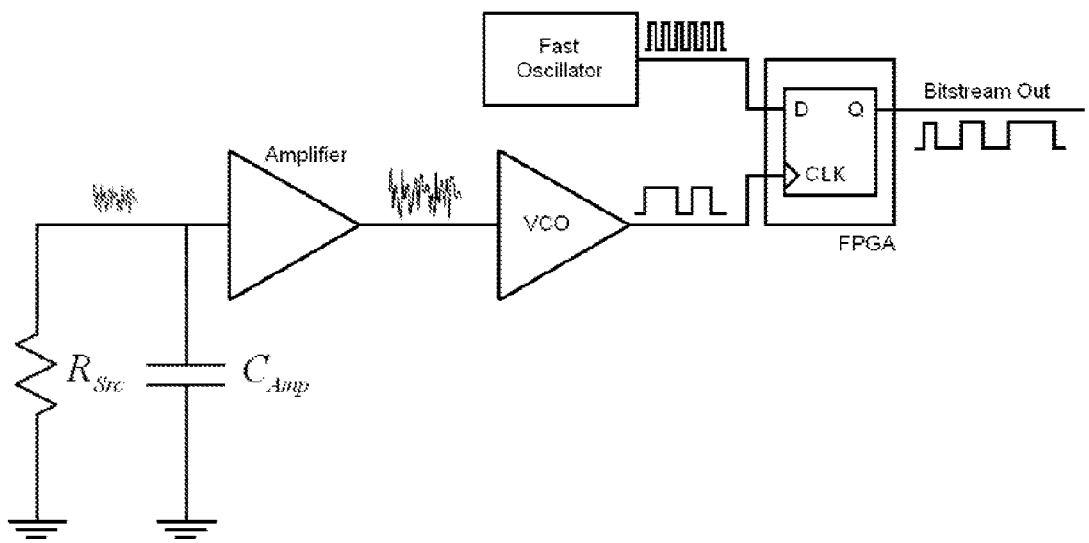
Figure 3:
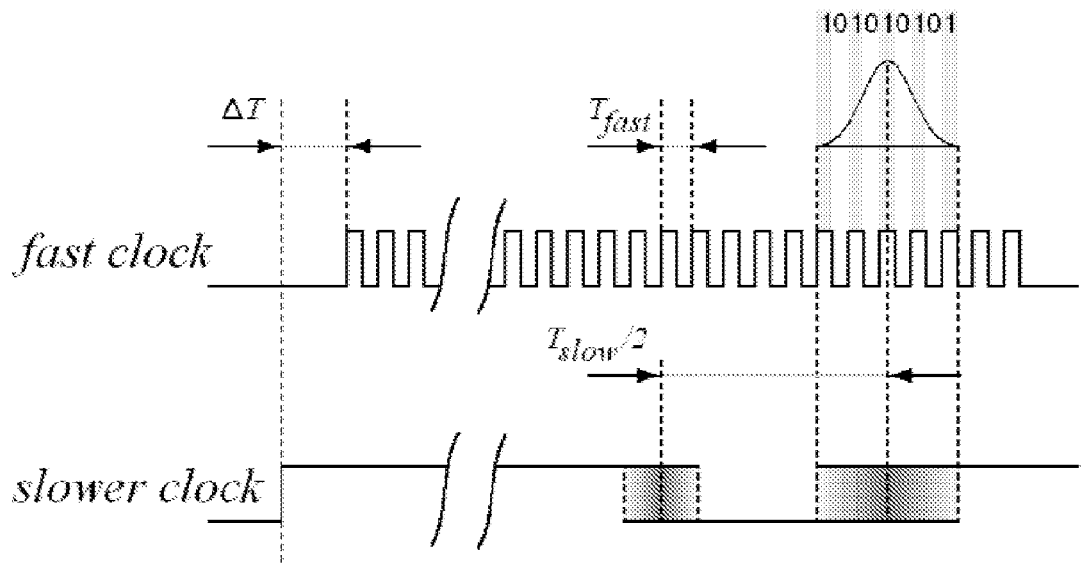

Between the given intervals, slower clock produce an output frequency value for each $x_1$ value. If the fast and the slower clock frequencies are known as well as the starting phase difference $\Delta T$, the output of the fast oscillator, sampled on the rising edge of the chaos-modulated slower clock, can be predicted as illustrated in FIG. 3. It can be shown that the binary data $S_{(dual\,oscillator)i}$ is the inverse of least significant bit of the ratio between the total periods of the slower clock and period of the fast clock:

$$S_{(dual\,oscillator)i} = \left(\left\lfloor\frac{\left(\sum_{j=1}^{i} T_{slow\,j}\right) - \Delta T}{T_{fast}/2}\right\rfloor \mod 2\right)' \quad (2)$$

$$T_{slow\,j} = \frac{x_{1max}}{\frac{f_{slow\,center}}{2}(x_{1j} + 2x_{1\,max})}$$

where fast clock has a 50% duty cycle and $x_{1j}$ values are obtained at the rising edges of the external periodical pulse signal, that is at times t satisfying $$f_{slow\,center}\left(\frac{x_{1(t)}}{2x_{1\,max}} + 1\right) t \mod 2\pi = 0.$$

We have numerically verified that, for high $f_{fast}$ frequencies, the effect of $\Delta T$ becomes negligible and the mean value of the output bit sequence $S_{dual\,oscillator}$ approaches the fast clock duty cycle.

According to the given Equation 2, binary sequences have been generated for different ratios of $f_{fast}$ and $f_{slow\,center}$. In conclusion, we have numerically verified that the bit sequence $S_{dual\,oscillator}$, passed the tests of FIPS-140-2 test suite without Von Neumann processing, down to $$\frac{f_{fast}}{f_{slow\,center}} = 40.$$

Figure 4:
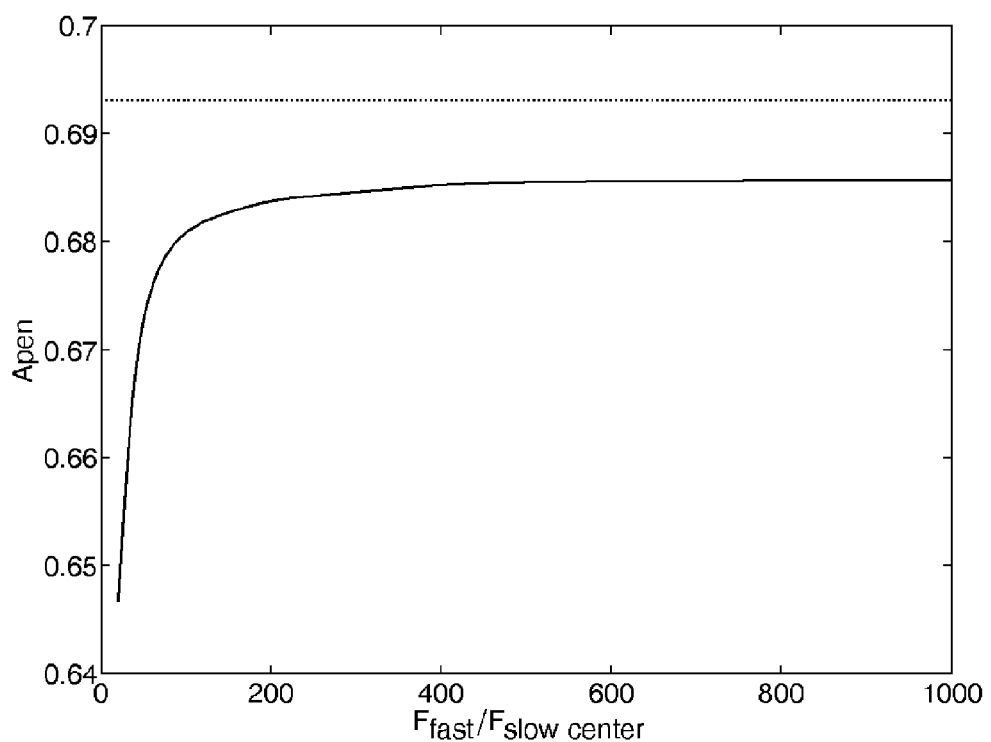

In FIG. 4 how the approximate entropy ApEn of order 8 for a sequence length of 20000 bit, can come close the maximum information entropy (ln 2) which might be possible for a perfect TRNG was shown as a function of $$\frac{f_{fast}}{f_{slow\,center}}.$$

As shown in FIG.

$$4\frac{f_{fast}}{f_{slow\,center}} = 200$$

is an optimum value for the given ratio after which ApEn does not change so much. As a result, in order to obtain perfectly uncorrelated binary sequences with maximum entropy, $f_{fast}$ frequency should be increased by considering a balanced duty cycle.

Due to the lack of access to a suitable fabrication facility, we have chosen to construct the proposed innovations using discrete components in order to show the feasibility of the circuits and we have also experimentally generated bit streams.

Figure 5:
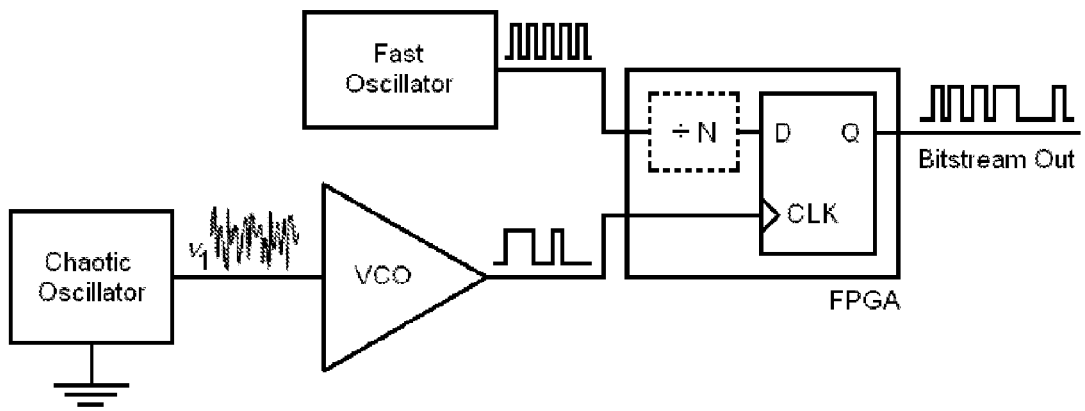

In the proposed innovation, dual oscillator architecture is exploited with the chaotic oscillator as shown in FIG. 5. In this circuit, 74HCT4046A VCO is used to implement the modulation of the slower clock frequency with the voltage $v_1$, which corresponds to the variable $x_1$. Center frequency of the VCO determines the center frequency of the slower clock.

As explained above, in order to remove the biasing of the output bit sequence, fast oscillator should have a balanced duty cycle. To get a satisfactory result, fast oscillator is implemented by dividing a low jitter $f_{fast}$ MHz Crystal oscillator by N inside the FPGA. In this way, we get a $f_{fast}/N$ MHz fast oscillator that has a guaranteed 50% duty cycle.

Figure 6:
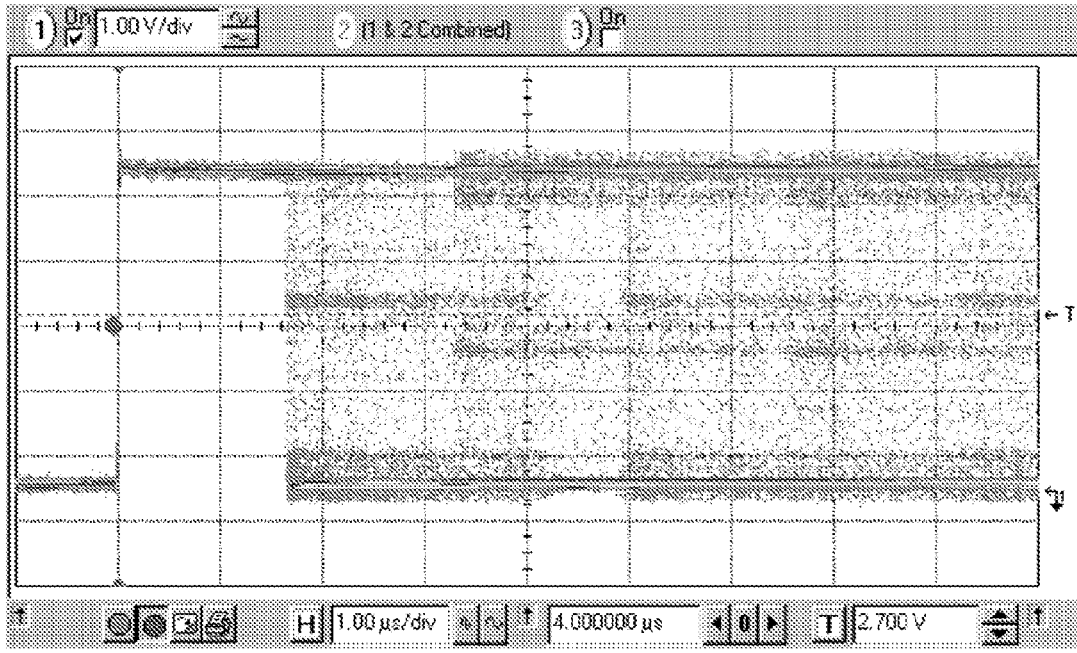

An FPGA based hardware, which has a PCI interface was designed to upload the binary data to the computer. Maximum data storage rate of our FPGA based hardware is 62 Mbps. In accordance with the numerical model, the suitable value of $$\frac{f_{fast}}{f_{slow\,center}}$$

is determined as 200 and we experimentally get successful results from the full NIST test suite when the slower clock frequency is adjusted up to 25 times the center operation frequency of the chaotic oscillator $f_o$. Then, fast oscillator is sampled on the rising edge of the slower clock using a D flip-flop or a T flip-flop inside the FPGA. Typical high deviation level achieved by chaos-modulated oscillator for the circuit is shown in FIG. 6. The measured minimum period and the maximum period, feature a standard deviation much greater than the fast oscillator period thus provides uncorrelated random bit stream.

Moreover, a bit stream of length 2 GBits was acquired through the PCI interface of the FPGA based hardware without Von Neumann processing. The slower clock frequency, which determines the throughput data rate is basically limited by the bandwidth of voltage v1 and can be adjusted up to $25f_o$ for successful test results. Although the frequency of the fast oscillator is $200f_{slow\,center}$, if a balanced duty cycle can be guaranteed, this frequency should be increased.

Finally, the obtained bits were subjected to full NIST test suite. As a result, we have experimentally verified that, the binary data obtained by this oscillator sampling technique, passed the tests of full NIST random number test suite without Von Neumann processing for a higher throughput speed when compared to previous RNG designs based on the other techniques. P-values were uniform and the proportion of passing sequences were greater than the minimum pass rate for each statistical test.

Throughput data rate of $S_{dual\ oscillator}$ can be estimated as $$f_{dual\ oscillator} \approx \frac{4}{\tau}$$

where T is the time constant of the chaotic oscillator. We can deduce that the chaotic oscillators can easily be integrated on today process with a nominal center frequency in the GHz range. However, it should be noted that chaotic circuits operating at much higher frequencies are reported in literature. For example, cadence simulation results of the BJT version of a chaotic oscillator operating at 5.3 GHz may result in the throughput in the order of a few hundred Gbit/s.

Figure 7:
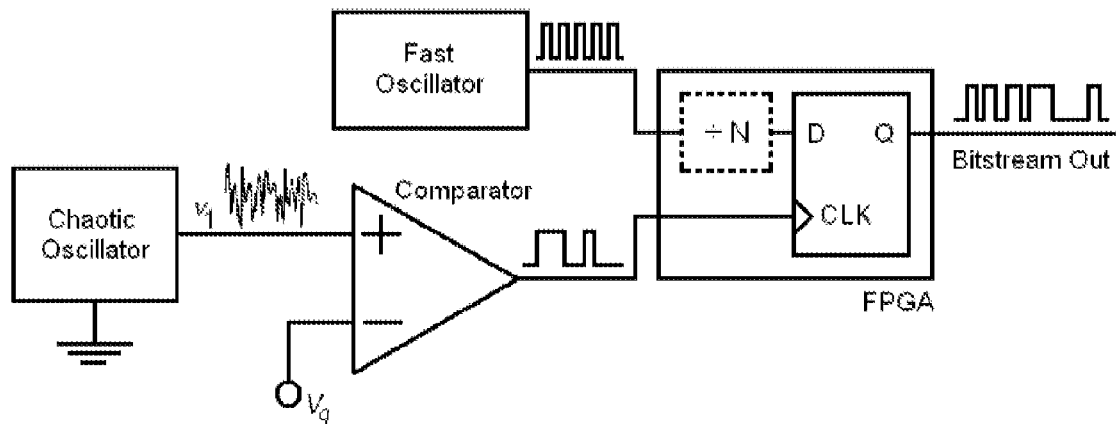
Figure 8:
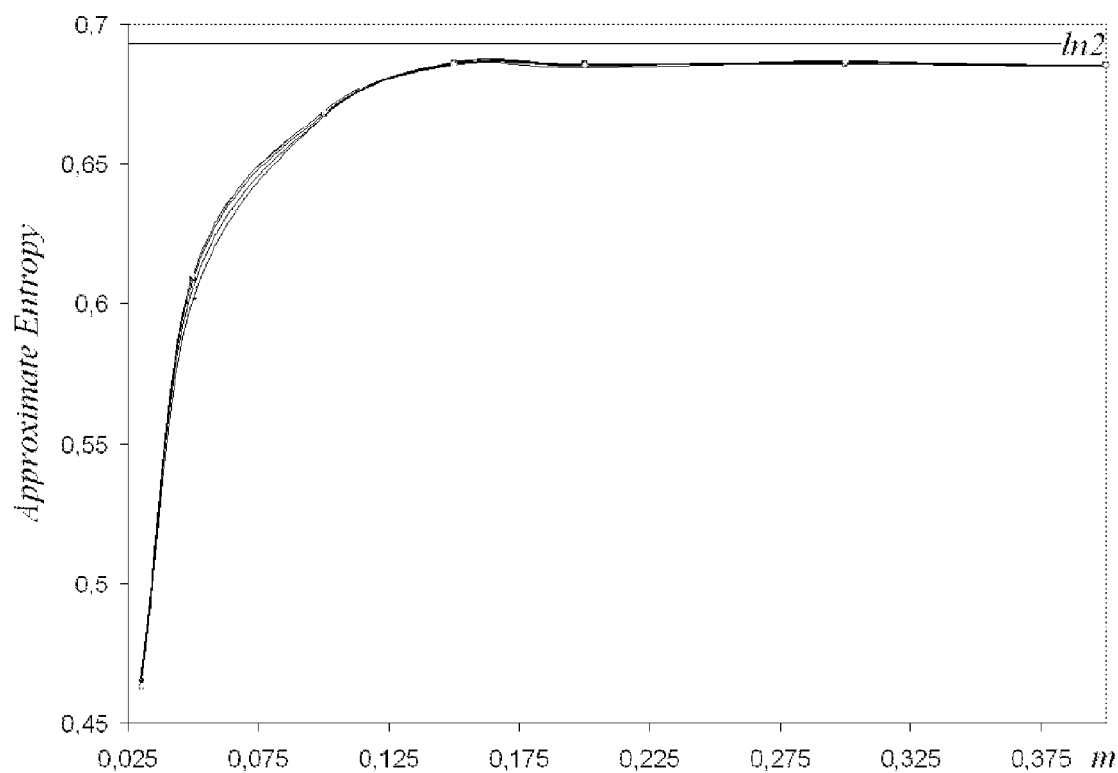

It should be noted that in the proposed innovation, the jittered or the chaos-modulated slower clock can be also replaced with a comparator by giving a proper treatment to trade-offs. As shown in FIG. 7, random binary sequence $S_{CDOA}$ is generated by sampling the output of a fast oscillator, at the rising and/or the falling edges of the comparator output where one of the signal, which corresponds to one of the state $(x_1, x_2, \ldots$ or $x_n)$ of the continuous time chaotic oscillator, is compared with a threshold voltage. Taking into account the trade-offs of this approach, first pro of the comparator based design is the reduced complexity, which derives from the fact that a comparator can be implemented using simple structures in IC compared to the implementation of VCOs and CCOs. A second advantage of using this comparator based design is the ability to reduce the $$\frac{f_{fast}}{f_{slow\ center}}$$

ratio, which was determined as 200 in the previous sections, down to 1. In FIG. 8 how the approximate entropy ApEn, of order 8 for a sequence length of 20000 bit, can come close the maximum information entropy (ln 2) which might be possible for a perfect TRNG was shown as a function of $$\frac{f_{fast}}{f_{slow\ center}} \text{ where } f_{slow\ center} = f_0.$$

As shown in FIG. 8, for $$f_0 = 1, 5, 10, 50, 100, 500, m = \frac{f_{fast}}{f_{slow\ center}} = 0.15$$

is an optimum value for the given ratio after which ApEn does not change so much. Although m=1 is a feasible ratio, in order to obtain perfectly uncorrelated binary sequences with maximum entropy, $f_{fast}$ frequency should be increased by considering a balanced duty cycle.

Besides the pros, there are cons of this approach as well. Comparator based approach does not offer the same level of flexibility as the chaos-modulated dual oscillator architecture does. Throughput data rate of comparator based dual oscillator architecture $S_{CDOA}$, effectively becomes 0.5 $f_0$ while it was 25$f_0$ for chaos-modulated dual oscillator architecture.

Figure 9:
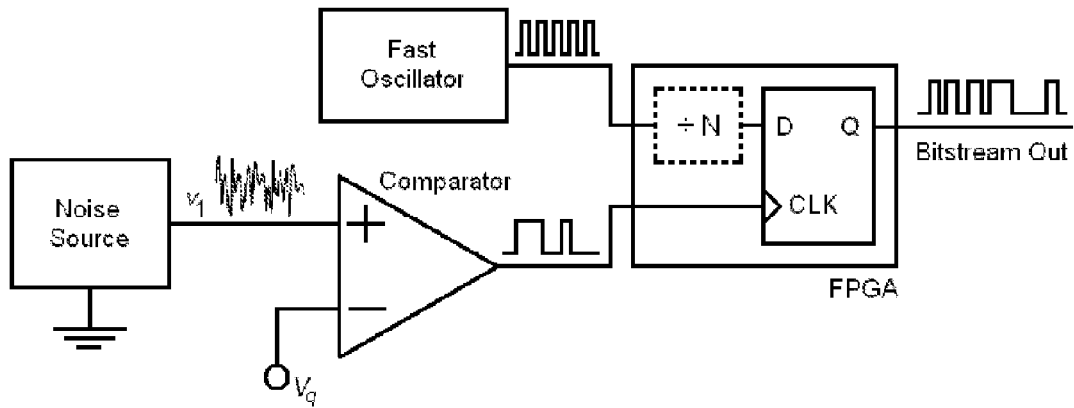

In addition, comparator based approach can be also applied in the classical dual oscillator architecture where a noise source is used to modulate the frequency of the slower clock. As shown in FIG. 9, application circuit contains a comparator, instead of a VCO or a CCO. At the rising and/or the falling edges of this comparator, random binary sequence is generated by sampling the output of the fast oscillator while noise voltage is compared with a threshold voltage.

Considering the trade-off between the throughput and simplicity, the use of continuous-time chaos with the proposed innovations is very promising in generating random numbers with very high outputs. As a result, the proposed methods are enhanced architectures where dual oscillator architecture is used with the chaotic oscillator to maximize the statistical quality and the throughput of the output sequence and to be robust against external interference, parameter variations and attacks aimed to force the throughput.

APPLICATION TO INDUSTRY

1 True Random Number Generator Based on an Autonomous Chaotic Oscillator for Applications in Cryptography In the proposed design, we have obtained random data by using dual oscillator architecture with the chaotic oscillator in order to increase the output throughput and the statistical quality of the generated bit sequences. In this design the chaotic oscillator output signal is used to modulate the frequency of a slower clock. Then, with the rising edge of the chaos-modulated slower clock, fast clock is sampled. We have developed a numerical model for the proposed design and have finally verified both numerically and experimentally that the binary data obtained by this oscillator sampling technique, passed the tests used in both the FIPS-140-2 test suite and the full NIST random number test suite for a higher throughput speed.

2 Autonomous Chaotic Oscillator

The autonomous chaotic oscillator may be used as the core of the RNG. The MOS chaotic oscillator is presented in FIG. 10 and is derived from the classical cross coupled sinusoidal oscillator by adding an RC-1 section and a differential-pair stage ($M_3$-$M_4$). $M_9$-$M_8$ and $M_{10}$-$M_{11}$ transistor pairs are used to implement simple current mirrors with a current transfer ratio of k. Assuming that $C_1=C_2=C_3=C$, routine analysis of the circuit yields the following Eqn. 3:

$$C(v_{C2} - v_{C1}) = \frac{\beta}{2}(v_{C2} - v_{C1})[(v_{C2} + v_{C1}) - 2V_{TH}] - \Delta i_L \quad (3)$$

$$L\Delta i_L = v_{C2} - v_{C1} - v_{C3}$$

$$C(v_{C2} + v_{C1}) = kI_0 - I_B - \frac{\beta}{4}[(v_{C2} + v_{C1} - 2V_{TH})^2 + (v_{C2} - v_{C1})^2]$$

$$2Cv_{C3} = \Delta i_L - \frac{2v_{C3}}{R} +$$

$$k \begin{cases} I_0 & \text{if } v_{C2} - v_{C1} \geq V_{sat} \\ g_m(v_{C2} - v_{C1})\sqrt{1 - \left(\frac{v_{C2} - v_{C1}}{\sqrt{2}\,V_{sat}}\right)^2} & \text{if } |v_{C2} - v_{C1}| < V_{sat} \\ -I_0 & \text{if } v_{C2} - v_{C1} \leq -V_{sat} \end{cases}$$

where $\Delta i_L = i_L - i_R$ (Differential inductors' current), $$g_m = \sqrt{\beta I_0}, \quad V_{sat} = \sqrt{\frac{2I_0}{\beta}}, \quad \beta = \mu_n C_{ox}\left(\frac{W}{L}\right)_{1,2};$$

$V_{TH}$ is the NMOS threshold voltage, $\mu_n$ is the electron mobility, $C_{ox}$ is the MOS oxide capacitance and W/L the aspect ratio of $M_1$-$M_2$ transistor pairs.

Using the normalized quantities:

$$R \equiv \sqrt{L/C}, \quad x_1 = \frac{v_{C2} - v_{C1}}{2V_{ref}}, \quad x_2 = \frac{v_{C2} + v_{C1}}{2V_{ref}}, \quad y = \frac{\Delta i_L R}{2V_{ref}},$$

$$z = \frac{v_{C3}}{2V_{ref}}, \quad t_n = t/RC,$$

and taking $V_{ref} = V_{TH}$, the equations of the system in Eqn. 3 transforms into:

$$\dot{x}_1 = bx_1(x_2 - 1) - y \quad (4)$$
$$\dot{y} = x_1 - z$$
$$\dot{x}_2 = d - \frac{b}{2}[(x_2 - 1)^2 + x_1^2]$$

$$2\dot{z} = y - 2z + k \begin{cases} c & \text{if } x_1 \geq x_{sat} \\ \sqrt{2bc}\, x_1 \sqrt{1 - \left(\frac{x_1}{\sqrt{2}\, x_{sat}}\right)^2} & \text{if } |x_1| < x_{sat} \\ -c & \text{if } x_1 \leq -x_{sat} \end{cases}$$

where $$b = \beta R V_{TH}, \quad c = \frac{I_0 R}{2V_{TH}}, \quad d = \frac{(kI_0 - I_B)R}{2V_{TH}}$$

and $x_{sat} = \frac{V_{sat}}{2V_{TH}} = \sqrt{\frac{c}{b}}$.

Figure 11:
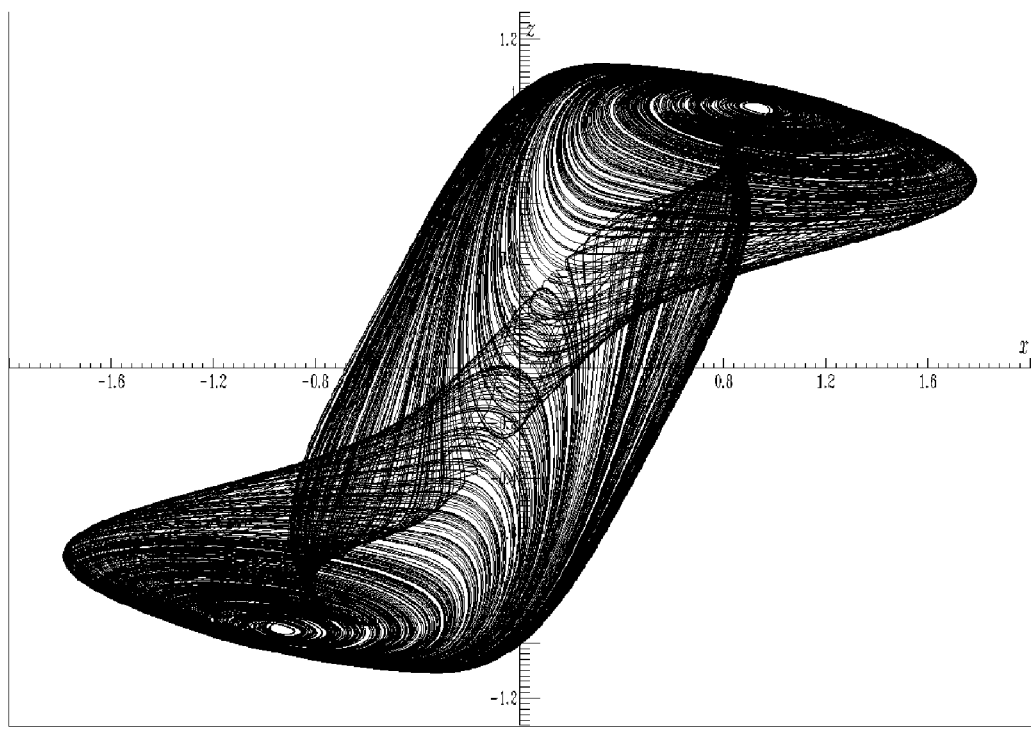

The equations in 4 generate chaos for different set of parameters. For example, the chaotic attractor shown in FIG. 11 is obtained from the numerical analysis of the system with b=0.9, c=0.15, d=0.7 and k=8 using a $4^{th}$-order Runge-Kutta algorithm with an adaptive step size.

Exploited chaotic oscillator may offer some considerable advantages over the existing ones. Circuit employs a differential Pair to realize the required nonlinearity, which is the most widely used basic analog building block due to its high IC performance. Moreover, the chaotic oscillator is balanced; hence it offers better power supply rejection and noise immunity.

3 Circuit Simulation

Figure 10:
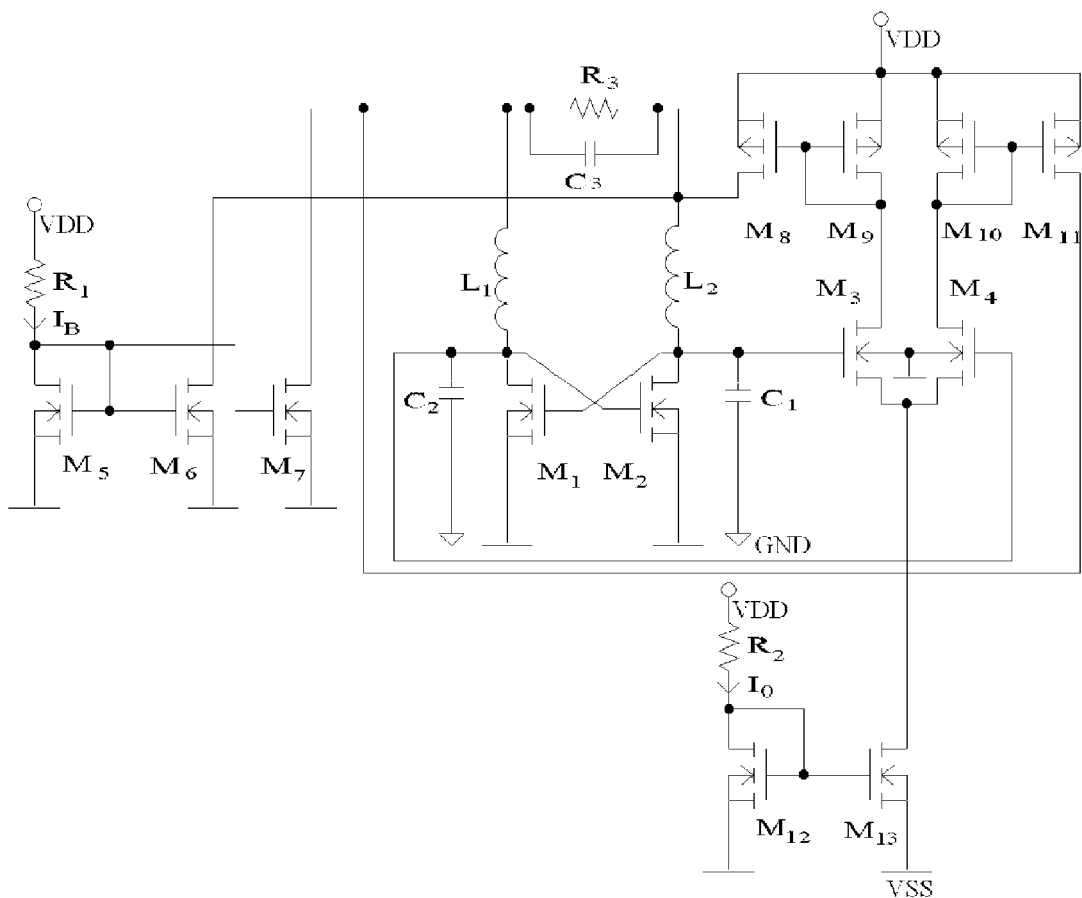
Figure 12:
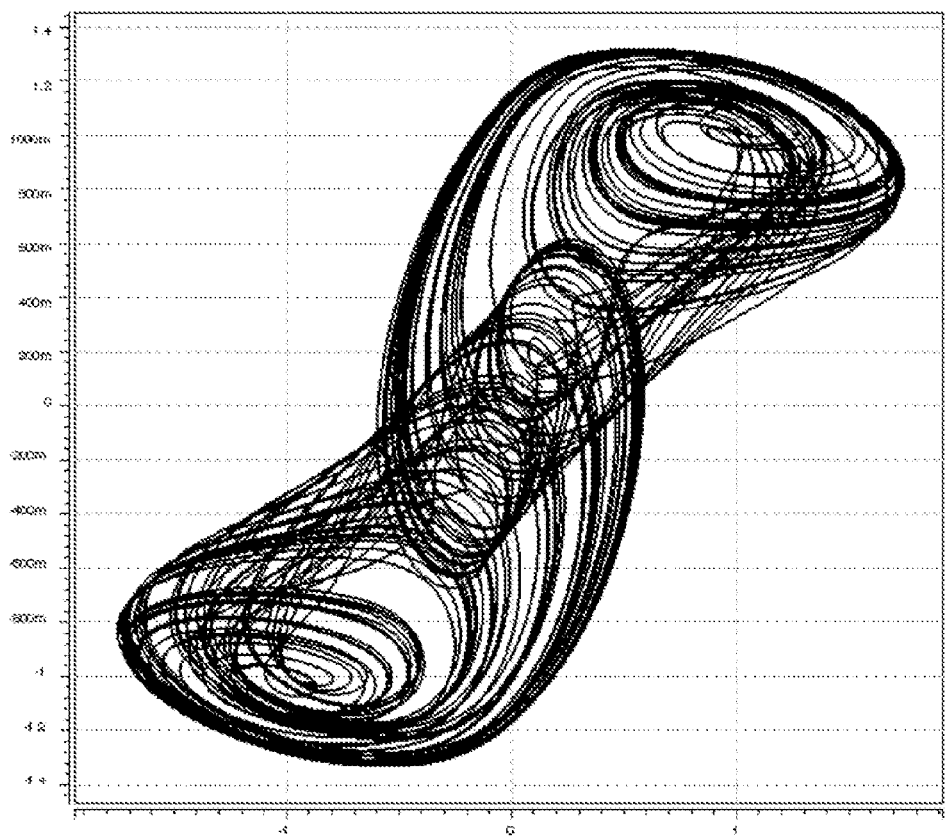

In order to show the high-frequency operation capability of the MOS chaotic oscillator, layout of the circuit given in FIG. 10 has been drawn using Cadence and the post-layout circuit has been simulated using SPICE (Level3) with the model parameters of 1.5μ CMOS process. The circuit was biased with ±2.5V power supply. The passive component values were:

$$L = 4.7\ \mu H, \quad C = 4.7\ pF,$$

$$\left(f_0 = \frac{1}{2\pi\sqrt{LC}} \approx 33.9\ \text{MHz}\right), \quad R = 1000\ \Omega$$

and the biasing currents were $I_0$=240 μA, $I_B$=100 μA, respectively. The observed phase-space corresponding to $v_{C2}$-$v_{C1}$ versus $v_{C3}$ is shown in FIG. 12.

It is clear that this MOS version of the chaotic oscillator requires off-chip inductors. Attempting to reduce the inductor Values while maintaining functionality was not possible without increasing the supply voltages, biasing currents and the transistor aspect ratios. However, similar chaotic attractor was also obtained by using SPICE simulation with L=20 nH, C=0.3 pF, ($f_0 \approx 2$ GHz), R=258Ω and with the model parameters of 0.35μ BiCMOS process whereas the supply voltages were ±2.5V and the biasing currents were $I_0$=1.3000 μA, $I_B$=400 μA. Finally, chaotic oscillator circuit is very suitable for monolithic implementation and capable of operating at very high frequencies.

4 Random Number Generation

Due to their extreme sensitivity to initial conditions and having a positive Lyapunov exponent and a noise-like power spectrum, chaotic systems lend themselves to be exploited for random number generation. In order to obtain random binary data from a continuous-time chaotic system, we have presented an interesting technique, which relies on generating a non-invertible binary data from the waveform of the given chaotic oscillator. It should be noted that non-invertibility is a key feature for generating PRNGs.

To obtain binary random bits from the chaotic attractor, we used the values of the state $x_1$ of the system in Equation 4. Note that, although 4-dimensional trajectories in the $x_1$-$y$-$x_2$-$z$ plane is invertible, one may obtain a non-invertible section by considering only the values corresponding to one of the states, say $x_1$. In this design, the output of a fast oscillator is sampled on the rising edge of the chaos-modulated slower clock using a D flip-flop. A voltage-controlled oscillator (VCO) is used to implement the modulation of the slower clock frequency with the chaotic signal which corresponds to the variable $x_1$. Center frequency of the VCO determines the center frequency of the slower clock. Drift between the two oscillators provides random bit generation to be more robust. Because of the nonlinear aliasing phenomenon associated with sampling, the dual oscillator architecture achieves increased output throughput and higher statistical quality.

Moreover, a numerical model for the proposed design has been developed allowing the estimation of the output bit entropy as a function of the design parameters. Assuming that VCO has a linear transfer function, frequency of the slower clock $f_{slow}$ can be calculated according to the given Equation 5

$$f_{slow} = f_{slow\ center}\left(\frac{x_1}{2x_{1\ max}} + 1\right) \quad (5)$$

where $$\frac{f_{slow}}{2} < f_{slow} < \frac{3 f_{slow}}{2}, \text{ for } -x_{1max} < x_1 < x_{1max}.$$

Figure 13:
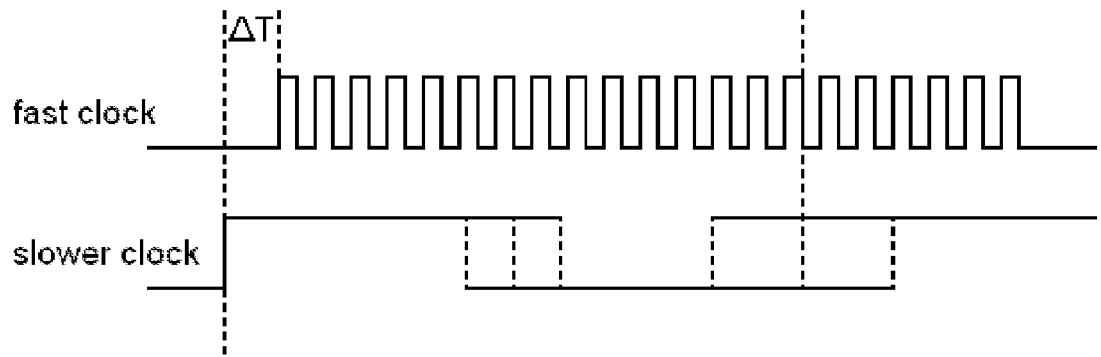

Between the given intervals, slower clock produce an output frequency value for each $x_1$ value. If the fast and the slower clock frequencies are known as well as the starting phase difference $\Delta T$, the output of the fast oscillator, sampled on the rising edge of the chaos-modulated slower clock, can be predicted as illustrated in FIG. 13. It can be shown that the binary data $S_{(dual\ oscillator)i}$ is the inverse of least significant bit of the ratio between the total periods of the slower clock and period of the fast clock:

$$S_{(dual\ oscillator)i} = \left( \left\lfloor \frac{\left(\sum_{j=1}^{i} T_{slow\ j}\right) - \Delta T}{T_{fast}/2} \right\rfloor \mod 2 \right)' \quad (6)$$

$$T_{slow\ j} = \frac{x_{1max}}{\frac{f_{slow\ center}}{2}(x_{1j} + 2x_{1max})}$$

where fast clock has a 50% duty cycle and $x_{1j}$ values are obtained at the rising edges of the external periodical pulse signal, that is at times t satisfying $$f_{slow\ center}\left(\frac{x_{1(t)}}{2x_{1max}} + 1\right) t \mod 2\pi = 0.$$

We have numerically verified that for high $f_{fast}$ frequencies, the effect of $\Delta T$ becomes negligible and the mean value of the output bit sequence $S_{dual\ oscillator}$ approaches the fast clock duty cycle.

According to the given Equation 6, binary sequences have been generated for different ratios of $f_{fast}$ and $f_{slow}$ center. In conclusion, we have numerically verified that the bit sequence $S_{dual\ oscillator}$, passed the tests of PIPS-140-2 test suite without Von Neumann processing, down to $$\frac{f_{fast}}{f_{slow\ center}} = 40.$$

Figure 14:
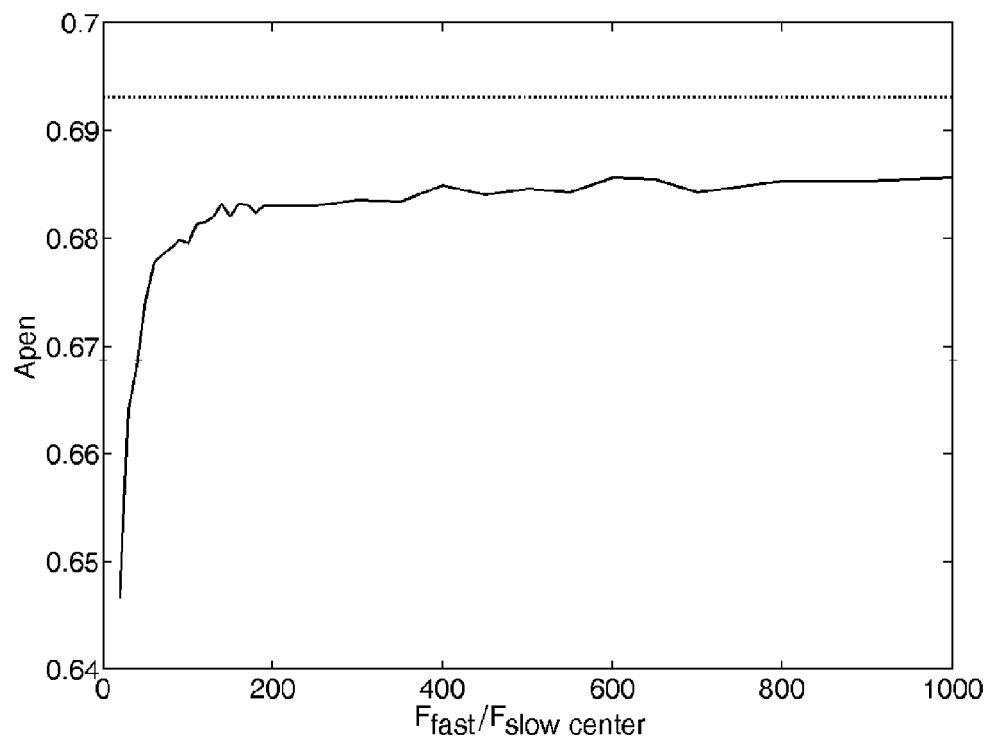

In FIG. 14 how the approximate entropy ApEn of order 8 for a sequence length of 20000 bit, can come close the maximum information entropy (ln 2) which might be possible for a perfect TRNG was shown as a function of $$\frac{f_{fast}}{f_{slow\ center}}.$$

As a result, in order to obtain perfectly uncorrelated binary sequences with maximum entropy, $f_{fast}$ frequency should be increased by considering a balanced duty cycle.

5 Experimental Verification and Hardware Realization of RNGs

Figure 15:
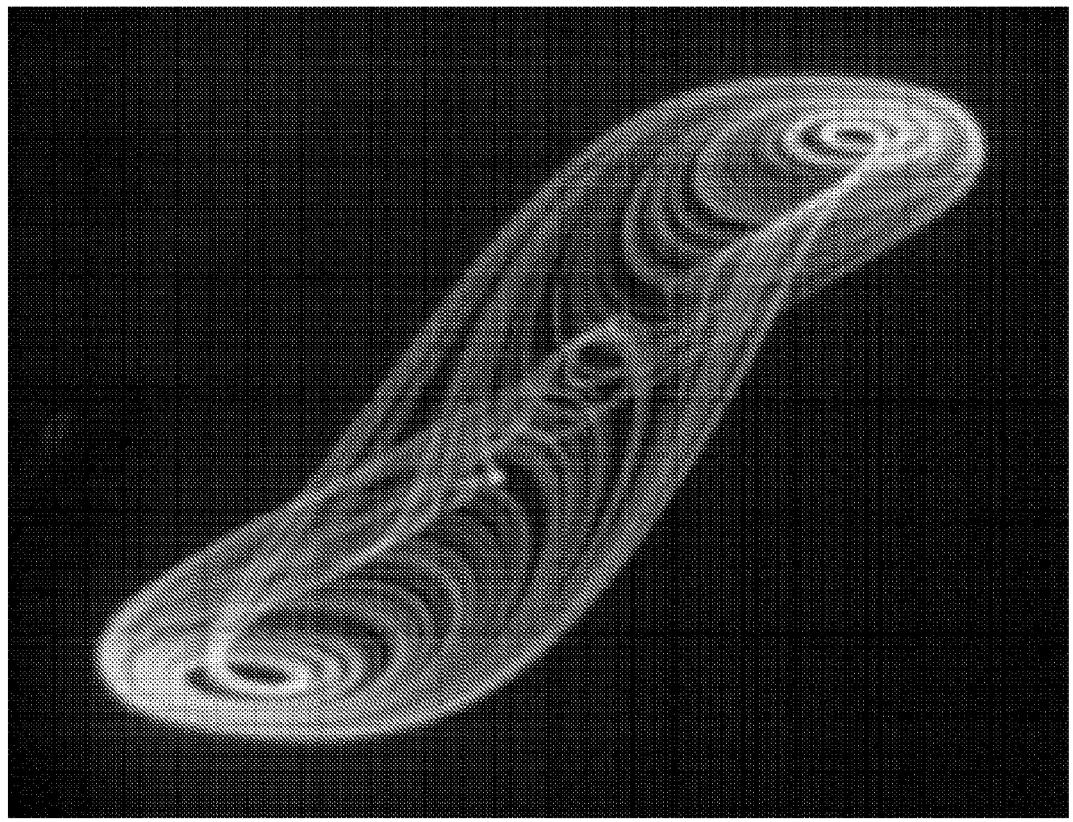

Due to the lack of access to a suitable fabrication facility, we have chosen to construct the chaotic oscillator and the proposed RNC using discrete components in order to show the feasibility of the circuits. For FIG. 10, the passive component values were L=9 mH, C=10 nF, R=1000Ω, $I_B$=100 μA and $I_0$=250 μA. The MOS transistors and the current sources, which were realized using simple current mirrors, were implemented with LM4007 CMOS transistor arrays. k was set equal to 8 by adjusting the ratio of the current mirror load resistors. The center operation frequency of the chaotic oscillator:

$$f_0 = \frac{1}{2\pi\sqrt{LC}},$$

was adjusted to a low frequency value as 16.77 KHz on purpose to provide the circuit not to be affected by parasitic capacitances. The circuit was biased with a ±5V power supply and the observed attractor is shown in FIG. 15.

5.1 Dual Oscillator Architecture

According to the procedure explained in Section 4, we have generated random bits by using dual oscillator architecture with the chaotic oscillator as shown in FIG. 5. In this circuit, 74HCT4046A VCO is used to implement the modulation of the slower clock frequency with the voltage $v_1=v_{C2}-v_{C1}$, which corresponds to the variable $x_1$. Center frequency of the VCO determines the center frequency of the slower clock.

As explained in Section 4, in order to remove the biasing of the output bit sequence, fast oscillator should have a balanced duty cycle. To get a satisfactory result, fast oscillator is implemented by dividing a low jitter 152 MHz crystal oscillator by N=8 inside the FPGA. In this way, we get a 19 MHz fast oscillator that has a guaranteed 50% duty cycle.

Figure 16:
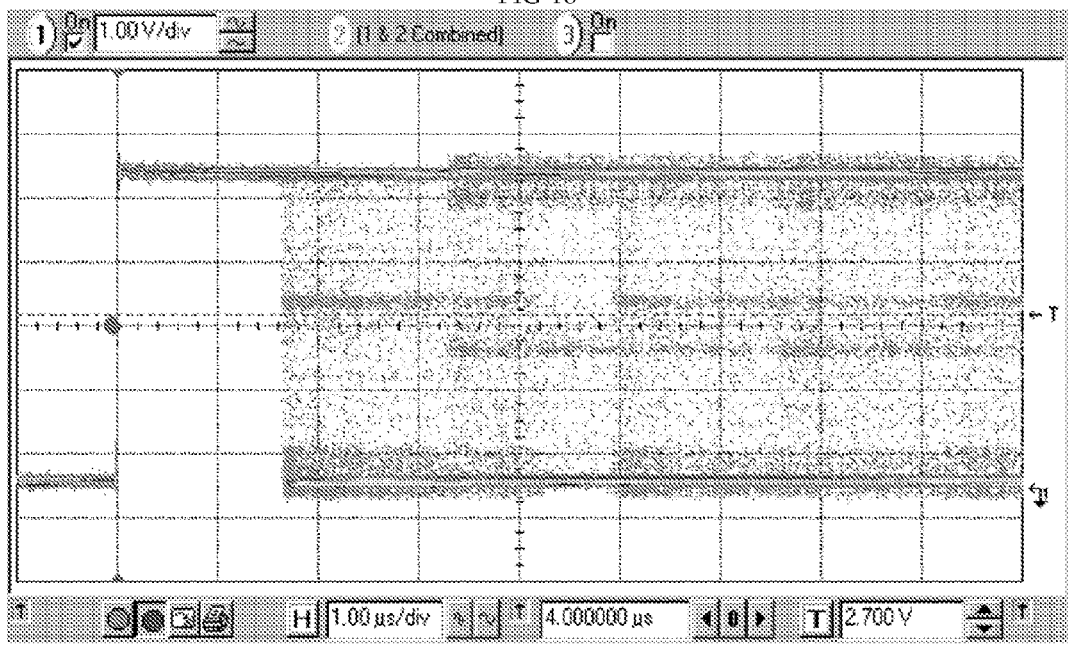

An FPGA based hardware, which has a PCI interface was designed to upload the binary data to the computer. Maximum data storage rate of our FPGA based hardware is 62 Mbps. In accordance with the numerical model, the initial value of $$\frac{f_{fast}}{f_{slow\ center}}.$$

is determined as 200 and we experimentally get successful results from the full NIST test suite when the slower clock frequency is adjusted up to 211 KHz. Then, 19 MHz fast oscillator is sampled on the rising edge of the slower clock using a D flip-flop inside the FPGA. High deviation level achieved by chaos-modulated oscillator for the circuit is shown in FIG. 16. The measured minimum period 3.255 μsec and the maximum period 8.360 μsec, feature a standard deviation much greater than the fast oscillator period thus provides uncorrelated random bit stream.

Moreover, a bit stream of length 2013 MBits was acquired through the PCI interface of the FPGA based hardware without Von Neumann processing. The slower clock frequency, which determines the throughput data rate is basically limited by the bandwidth of voltage $v_1$ and can be adjusted up to 211 KHz for successful test results. Although the frequency of the fast oscillator is 19 MHz, if a balanced duty cycle can be guaranteed, this frequency should be increased.

Finally, the obtained bits were subjected to full NIST test suite and we have experimentally verified that the binary data obtained by this oscillator sampling technique pass the tests of full NIST test suite without Von Neumann processing for a higher throughput speed. The corresponding results for the uniformity of p-values and the proportion of passing sequences of the dual oscillator architecture are given in the Table 1. It is reported that, for a sample size of 335×1 MBits, the minimum pass rate for each statistical test with the exception of the random excursion (variant) test is approximately 0.973.691.

By using a continuous-Lime chaotic oscillator with a center frequency in the GHz range as the core of the RNG, throughput data rate of dual oscillator architecture, which was determined as 221 KHz, may be probably higher. In Section 3, we have presented post-layout circuit simulation results, which leads to a center frequency of operation at ($f_0 \approx 33.9$ MHz). Considering that the circuit was realized on 0.35μ BiCMOS process as given in Section 3 ($f_0 \approx 2$ GHz), we can deduce that the chaotic oscillator can easily be integrated on today process with a nominal center frequency in the GHz range. However, it should be noted that chaotic circuits operating at much higher frequencies are reported in literature. So, all these indicate that the use of continuous-time chaos is very promising in generating random numbers with very high throughput, of the order of tens Gbps.

TABLE 1

Results of the NIST test suite for RNG using dual oscillator architecture with an autonomous chaotic oscillator.

| STATISTICAL TESTS | $S_{dual\ oscillator}$ | |
|---|---|---|
| | P-Value | Proportion |
| Frequency | 0.373012 | 0.9881 |
| Block Frequency | 0.251604 | 0.9821 |
| Cumulative Sums | 0.599316 | 0.9881 |
| Runs | 0.008595 | 0.9791 |
| Longest Run | 0.279886 | 0.9881 |
| Rank | 0.247746 | 0.9881 |
| FFT | 0.324180 | 0.9940 |
| Nonperiodic Templates | 0.913396 | 1.0000 |
| Overlapping Templates | 0.712343 | 0.9940 |
| Universal | 0.531095 | 0.9881 |
| Apen | 0.706149 | 0.9940 |
| Random Excursions | 0.549331 | 0.9951 |
| Random Excursions Variant | 0.580051 | 1.0000 |
| Serial | 0.928429 | 0.9970 |
| Linear Complexity | 0.275709 | 0.9851 |

6 Truly Random Number Generators Based on a Double-Scroll Attractor

In the proposed design, we have obtained random data by using dual oscillator architecture with the chaotic oscillator in order to increase the output throughput and the statistical quality of the generated bit sequences. In this design the chaotic oscillator output signal is used to modulate the frequency of a slower clock. Then, with the rising edge of the chaos-modulated slower clock, fast clock is sampled. Finally we have experimentally verified that the binary data obtained by this oscillator sampling technique pass the tests of full NIST random number test suite for a higher throughput speed than the one obtained by using chaotic oscillator alone.

7 Double-Scroll Attractor

The double-scroll attractor which is used as the core of the RNG is expressed by the Equation 7. It should be noted that when the nonlinearity is replaced by a continuous nonlinearity, the system is "qualitatively similar" to Chua's oscillator.

$$\dot{x} = y$$

$$\dot{y} = z$$

$$\dot{z} = -ay - ay - az + sgn(x) \quad (7)$$

Figure 17:
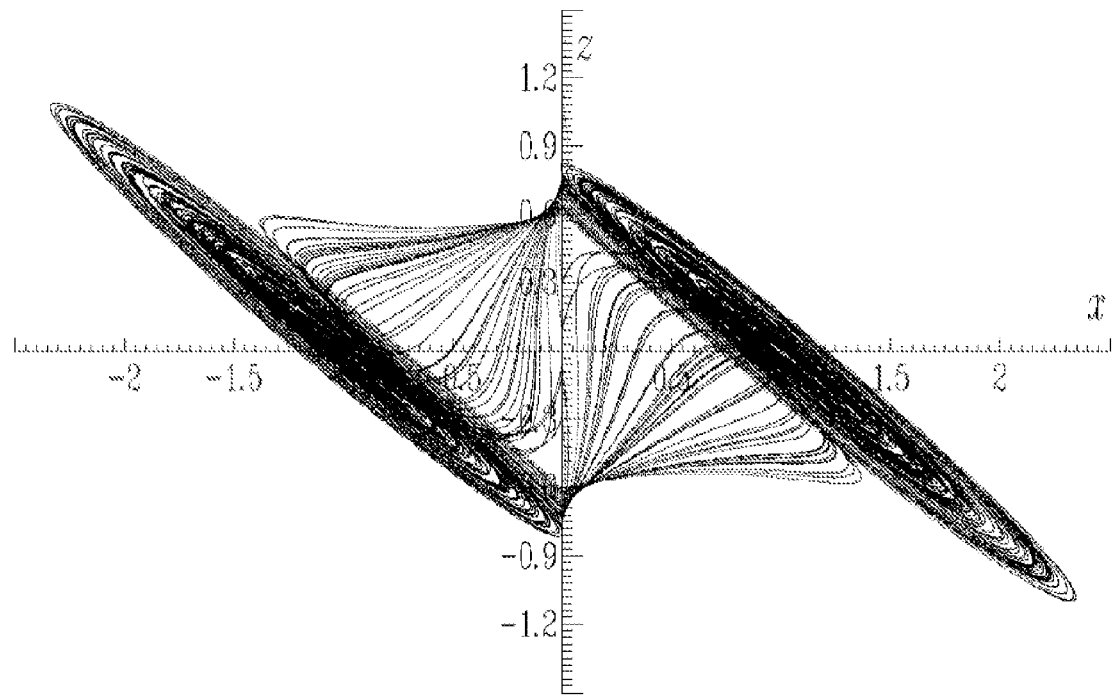

The equations in 7 generate chaos for different set of parameters. For example, the chaotic attractor shown in FIG. 17 is obtained from the numerical analysis of the system with, a=0.666 using a $4^{th}$-order Runge-Kutta algorithm with an adaptive step size.

8 Random Bit Generation

In order to obtain random binary data from a continuous-time chaotic system, we have presented an interesting technique, which relies on generating a non-invertible binary data from the waveform of the given chaotic system. It should be noted that non-invertibility is a key feature for generating PRNGs. We proposed a novel RNG design which uses a dual oscillator architecture with the chaotic oscillator. In this design, the output of a fast oscillator is sampled on the rising edge of the chaos-modulated slower clock using a B flip-flop. A voltage-controlled oscillator (VCO) is used to implement the modulation of the slower clock frequency with the chaotic oscillator output signal. Center frequency of the VCO determines the center frequency of the slower clock. Drift between the two oscillators provides random bit generation to be more robust. Because of the nonlinear aliasing phenomenon associated with sampling, the dual oscillator architecture achieves increased output throughput and higher statistical quality. It has been reported that in order to obtain an uncorrelated random bit stream, the modulated slower oscillator period should feature a standard deviation much greater than the fast oscillator period. Though we have not numerically analyzed the dual oscillator architecture, we have experimentally verified that the binary data, obtained by this oscillator sampling technique, pass the tests of full NIST test suite without Von Neumann processing for a higher throughput speed.

9 Hardware Realization of RNG

Due to the lack of access to a suitable fabrication facility, we have chosen to construct the proposed circuit using discrete components in order to show the feasibility of the circuit.

Figure 18:
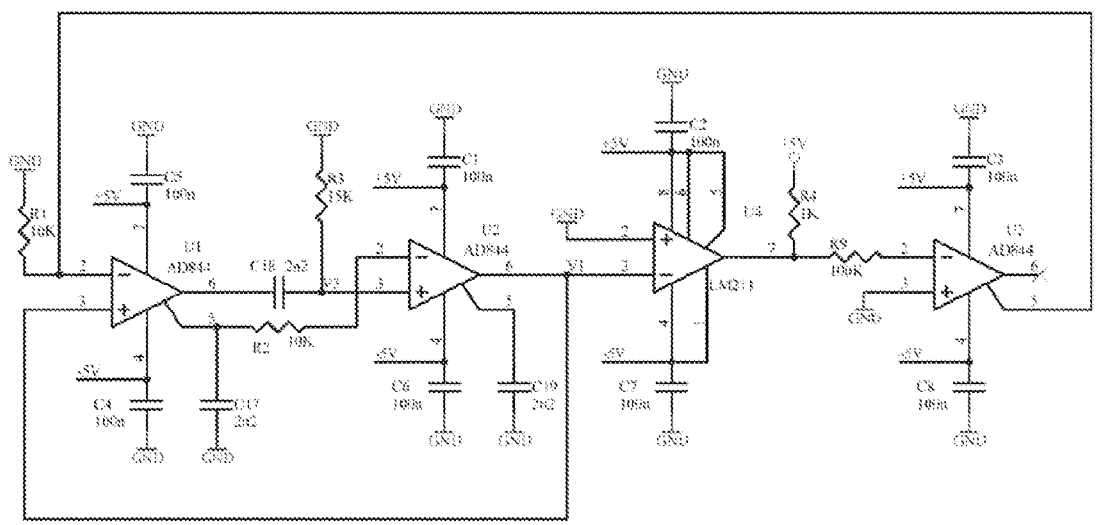

Circuit was biased with a +5V power supply. The circuit diagram realizing the double-scroll attractor is given in FIG. 18. AD844 is used as a high speed operational amplifier and LM211 voltage comparator is used to realize required non-linearity. The passive component values were taken as: $R_1 = R_2$ $aR_3 = R = 10$ kΩ, $R_3$ 15 kΩ for a=0.666, $C_{17} = C_{18} = C_{19} = C = 2.2$ nF, and RK=100 kΩ.

Figure 19:
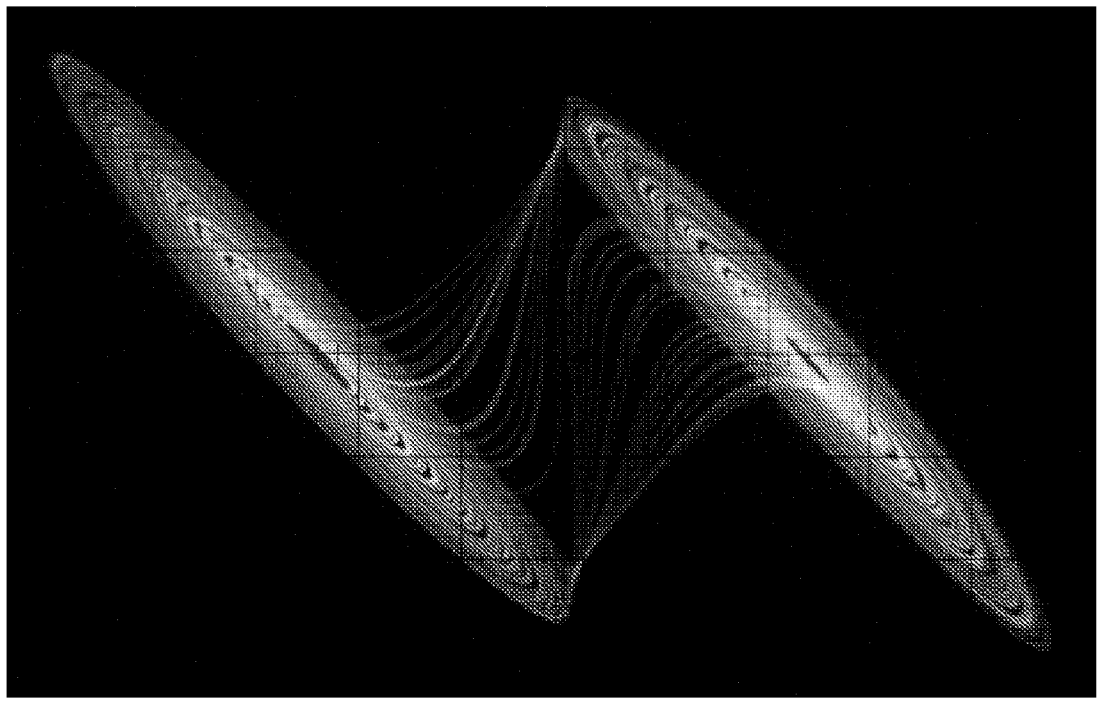

Therefore the main frequency of the chaotic oscillator:

$$f = \frac{1}{2\pi\tau}$$

corresponding to time constant T where $\tau = \cdot RC$, was adjusted to a low frequency value as 7.234 KHz on purpose to provide the circuit not to be affected by parasitic capacitances. The observed attractor is shown in FIG. 19.

9.1 Dual Oscillator Architecture

In the proposed innovation, dual oscillator architecture is exploited with the chaotic oscillator as shown in. FIG. 5. In this circuit, 74HCT4046A VCO is used to implement the modulation of the slower clock frequency with the voltage $v_1$, which corresponds to the variable x. Center frequency of the VCO determines the center frequency of the slower clock.

In order to remove the biasing of the output bit sequence, fast oscillator should have a balanced duty cycle. To get a satisfactory result, fast oscillator is implemented by dividing a low jitter 152 MHz crystal oscillator by N=−8 inside the FPGA. In this way, we get a 19 MHz fast oscillator that has a guaranteed 50% duty cycle.

Figure 20:
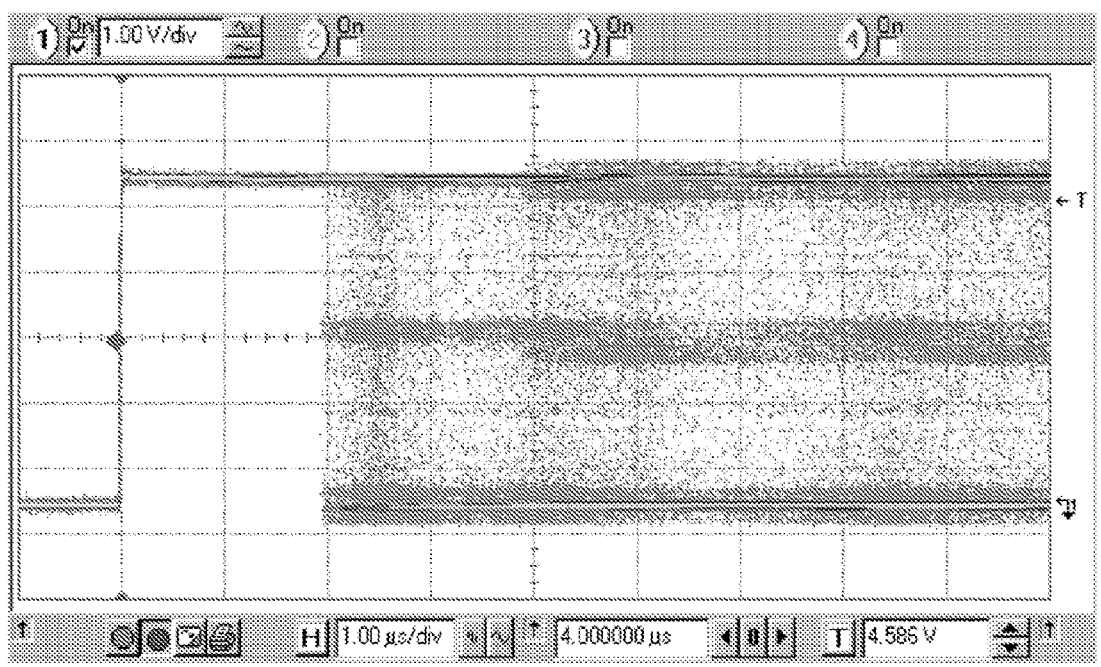

An FPGA based hardware, which has a PCI interface was designed to upload the binary data to the computer. Maximum data storage rate of our FPGA based hardware is 62 Mbps. The slow and fast oscillators have center frequency ratios on the order of 1:100. In our design, we experimentally get successful results from the full NIST test suite when the slower clock frequency is adjusted up to 170 KHz. Then, 19 MHz fast oscillator is sampled on the rising edge of the slower clock using a D flip-flop inside the FPGA. An oscilloscope snapshot which shows the high deviation level achieved by chaos-modulated oscillator for the circuit is depicted in FIG. 20. The measured minimum period 3.875 μsec and the maximum period 13.468 μsec, feature a standard deviation much greater than the fast oscillator period thus provides uncorrelated random bit stream. Moreover, a bit stream of length 24.2 GBytes was acquired through the PCI interface of the FPGA based hardware without Von Neumann processing. The slower clock frequency, which determines the throughput data rate is basically limited by the bandwidth of voltage $v_1$ and can be adjusted up to 170 KHz for successful test results. Although the frequency of the fast oscillator is 19 MHz, if a balanced duty cycle can be guaranteed, this frequency should be increased.

Finally, the obtained bits were subjected to full. NIST test suite and we have experimentally verified that the binary data obtained by this oscillator sampling technique pass the tests of full NIST test suite without Von Neumann processing for a higher throughput speed. The corresponding test results are given in Table 2. The minimum pass rates for each statistical test with the exception of the random excursion (variant) test for RNG using dual oscillator architecture is also given in the first line of Table 2.

In some examples, a chip realization of the double-scroll system with a center frequency of operation $$f = \frac{1}{2\pi\tau_{new}} = 500 \text{ KHz}$$

has been presented. Considering that the circuit in was realized on a relatively slow 1.2 u CMOS process, we can deduce that the circuit can easily be integrated on today's process at a couple of 10 MHz. However, it should be noted that chaotic circuits operating at much higher frequencies are reported in the literature. By using a continuous-time chaotic oscillator with a higher main frequency as the core of the RNG then throughput data rate of dual oscillator architecture, which was determined as 170 KHz, may be probably higher than the rate indicated above.

TABLE 2

Results of the NIST test suite for RNG using dual oscillator architecture with a double-scroll attractor.

| STATISTICAL TESTS | $S_{dual\text{-}oscillator}$ Bitsequence |
|---|---|
| The Minimum Pass Rates | 0.9736 |
| Frequency | 0.9940 |
| Block Frequency | 0.9940 |
| Cumulative Sums | 0.9925 |
| Runs | 0.9940 |
| Longest Run | 0.9881 |
| Rank | 0.9881 |
| FFT | 0.9970 |
| Nonperiodic Templates | 0.9895 |
| Overlapping Templates | 0.9821 |
| Universal | 0.9881 |
| Apen | 0.9851 |
| Random Excursions | 0.9914 |
| Random Excursions Variant | 0.9900 |

TABLE 2-continued

Results of the NIST test suite for RNG using dual oscillator architecture with a double-scroll attractor.

| STATISTICAL TESTS | $S_{dual\text{-}oscillator}$ Bitsequence |
|---|---|
| Serial | 0.9895 |
| Linear Complexity | 0.9761 |

10 Truly Random Number Generators Based on Continuous-Time Chaos

In spite of the fact that, the use of discrete-time chaotic maps in the realization of RNG is well-known for some time, it was only recently shown that continuous-time chaotic oscillators can also be used to realize TRNGs. Following up in this direction, we investigated the usefulness of the proposed chaotic oscillators as the core of a RNG.

Although many chaotic oscillators exist in the literature, only a few of them are designed concerning high-performance IC design issues, such as low power consumption, high-frequency operation, operation capability at low voltage levels. In this work, we present simple non-autonomous chaotic oscillators, which are suitable for high-performance IC realization.

We have proposed a RNG design which uses a dual oscillator architecture with the proposed chaotic oscillator in order to increase the output throughput and the statistical quality of the generated bit sequences. In this design, the chaotic oscillator output signal is used to modulate the frequency of a slower clock. Then, with the rising edge of the chaos-modulated slower clock, fast clock is sampled. Finally, we have experimentally verified that the binary data obtained by this oscillator sampling technique Passed the tests of full. MIST random number test suite for a higher throughput speed than the one obtained by using continuous-time chaotic oscillator alone.

11 Proposed Oscillators

Figure 21:
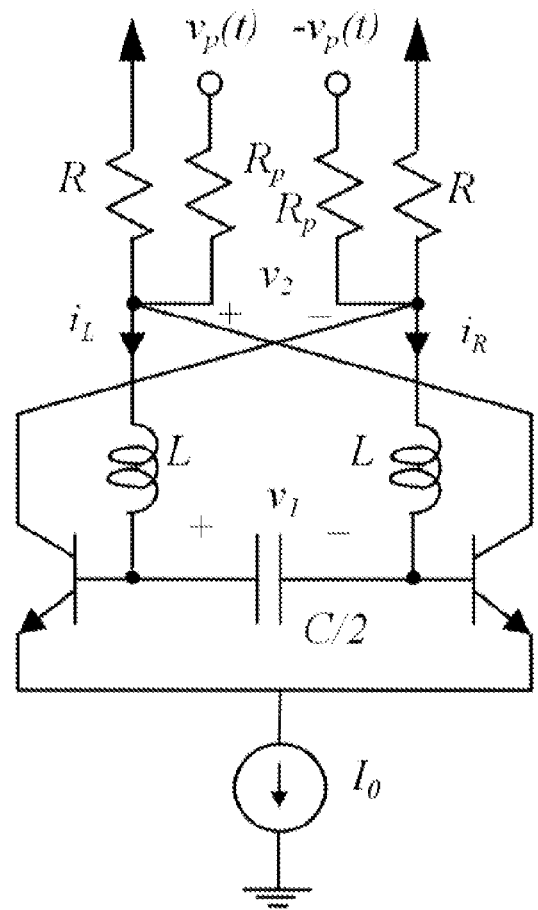

The proposed bipolar chaotic oscillator is presented in FIG. 21. Assuming that the parasitic capacitances appearing between the collectors of the bipolar transistors and the ground re denoted by $C_p$, routine analysis of the circuit yields the following state equations:

$$C\dot{v}_1 = -i_3 \quad (8)$$

$$L\dot{i}_3 = (v_1 - v_2)$$

$$C_p\dot{v}_2 = i_3 - \left(\frac{1}{R} + \frac{1}{R_p}\right)v_2 + \frac{2}{R_p}V_p\text{sgn}(\sin\Omega t) + I_0\tanh(v_1/2V_T)$$

where $i_3 = i_R - i_L$ and $v_p(t)$ is the external periodical pulse train defined as $v_p(t) = \text{sgn}(\sin \Omega t)$ and $V_T$ is the thermal voltage ($V_T = kT/q$), which is equal to 25.8 mV at room temperature.

Using the normalized quantities: $R_0 \equiv \sqrt{L/C}$, $x = v_1/V_s$, $y = i_3 R_0/V_s$, $z = v_2/V_s$, $c_0 = I_0 R_0/V_s$, $\alpha = R_0/R_p$, $\beta = R_0/R$, $\omega \equiv \Omega\sqrt{LC}$ and taking $V_p = 0.5V_s = V_T$ and $t_n = t/RC$, where $V_s$ is an arbitrary scaling voltage, the equations of the system in Eqn. 8 transforms into:

$$\dot{x} = -y$$

$$\dot{y} = x - z$$

$$\epsilon\dot{z} = y - (\alpha+\beta)z | \alpha sgn(\sin \omega t) | c_0 \tan h(x) \quad (9)$$

Figure 22:
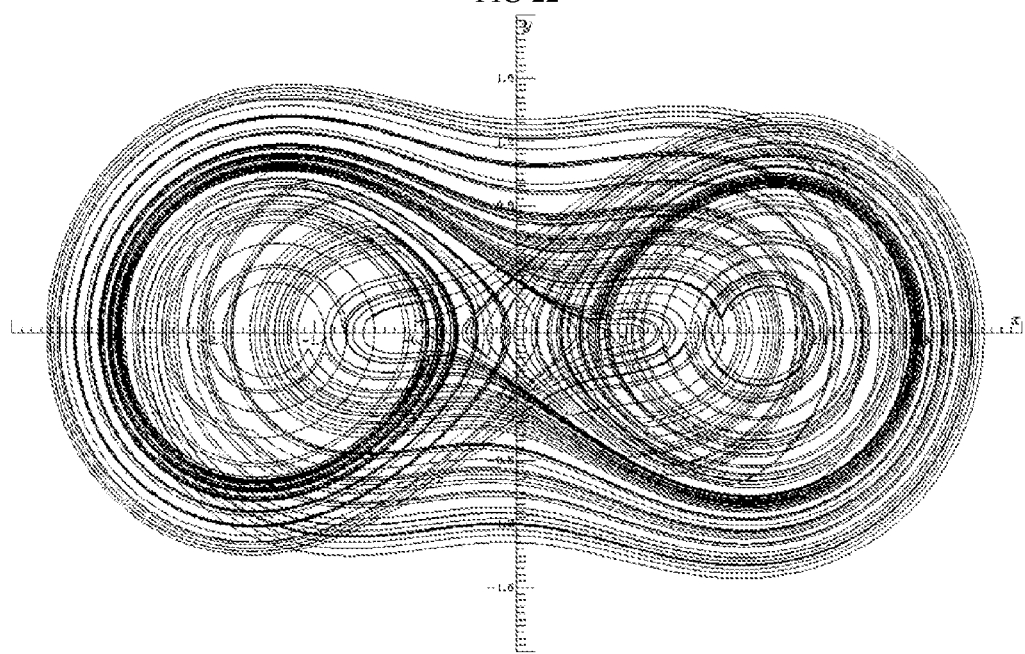

The equations in 9 generate chaos for different set of parameters. For example, the chaotic attractor shown in FIG. 22 is obtained from the numerical analysis of the system with $c_0=25$, $\alpha=4$, $\beta=12$, $\omega=0.27$, $\epsilon=0.3$ using a $4^{th}$-order Runge-Kutta algorithm with an adaptive step size.

Figure 23:
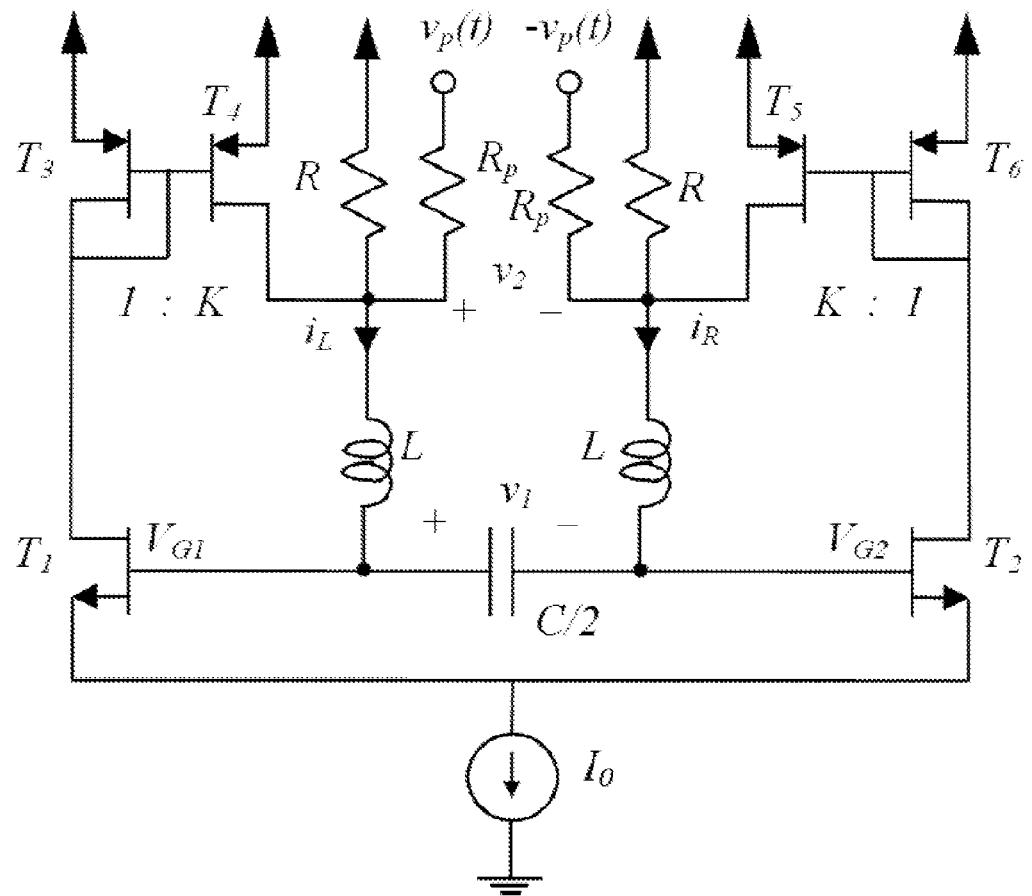

The proposed CMOS chaotic oscillator is presented in FIG. 23. $T_3$-$T_4$ and $T_5$-$T_6$ transistor Pairs are used to implement simple current mirrors, where the current ratios of the mirrors are denoted by K. Assuming that the parasitic capacitances appearing between the gates of $T_1$-$T_2$ transistor pairs and the ground are denoted by $C_p$, routine analysis of the circuit yields the following Eqn. 10:

$$C\dot{v}_1 = -i_3 \qquad (10)$$
$$L\dot{i}_3 = (v_1 - v_2)$$
$$C_p\dot{v}_2 = i_3 - \left(\frac{1}{R} + \frac{1}{R_p}\right)v_2 + \frac{2}{R_p}V_p\mathrm{sgn}(\sin\Omega t) +$$
$$K\begin{cases} I_0 & \text{if } V_{G1}-V_{G2} \geq \sqrt{2}V_{sat} \\ g_m(V_{G1}-V_{G2})\sqrt{1-\left(\frac{V_{G1}-V_{G2}}{2V_{sat}}\right)^2} & \text{if } \sqrt{2}V_{sat} > V_{G1}-V_{G2} \geq -\sqrt{2}V_{sat} \\ -I_0 & \text{if } V_{G1}-V_{G2} < -\sqrt{2}V_{sat} \end{cases}$$

where $i_3=i_R-i_L$, $v_p(t)=\mathrm{sgn}(\sin\Omega t)$ $$g_m = \sqrt{\mu_n C_{ox}\frac{W}{L}I_0}, \quad V_{sat} = \sqrt{\frac{I_0}{\mu_n C_{ox,}\frac{W}{L}}} \quad \text{and} \quad \frac{W}{L}$$

is the width-length ratio of $T_1$-$T_2$ transistor pairs.

Using the normalized quantities:
$R_0\equiv\sqrt{L/C}$, $x=V_{G1}/V_s$, $y=i_3R_0/V_s$, $z=V_{G2}/V_s$,
$c_0=2I_0R_0/V_s$, $\alpha=R_0/R_p$, $\beta=R_0/R$, $b_0=R_0\beta V_s/2$, $\omega\equiv\Omega\sqrt{LC}$ and taking $V_p=0.5V_s$ and $t_n=t/RC$, where $V_s$ is an arbitrary scaling voltage, the equations of the system in Eqn. 10 transforms into:

$$\dot{x} = -y \qquad (11)$$
$$\dot{y} = x - z$$
$$\epsilon\dot{z} = y - (\alpha+\beta)z + \alpha\mathrm{sgn}(\sin\omega t) +$$
$$K\begin{cases} 0.5c_0 & \text{if } x \geq \sqrt{\frac{c_0}{2b_0}} \\ b_0 x\sqrt{\frac{c_0}{b_0}-x^2} & \text{if } \sqrt{\frac{c_0}{2b_0}} > x \geq -\sqrt{\frac{c_0}{2b_0}} \\ -0.5c_0 & \text{if } x < -\sqrt{\frac{c_0}{2b_0}} \end{cases}$$

Figure 24:
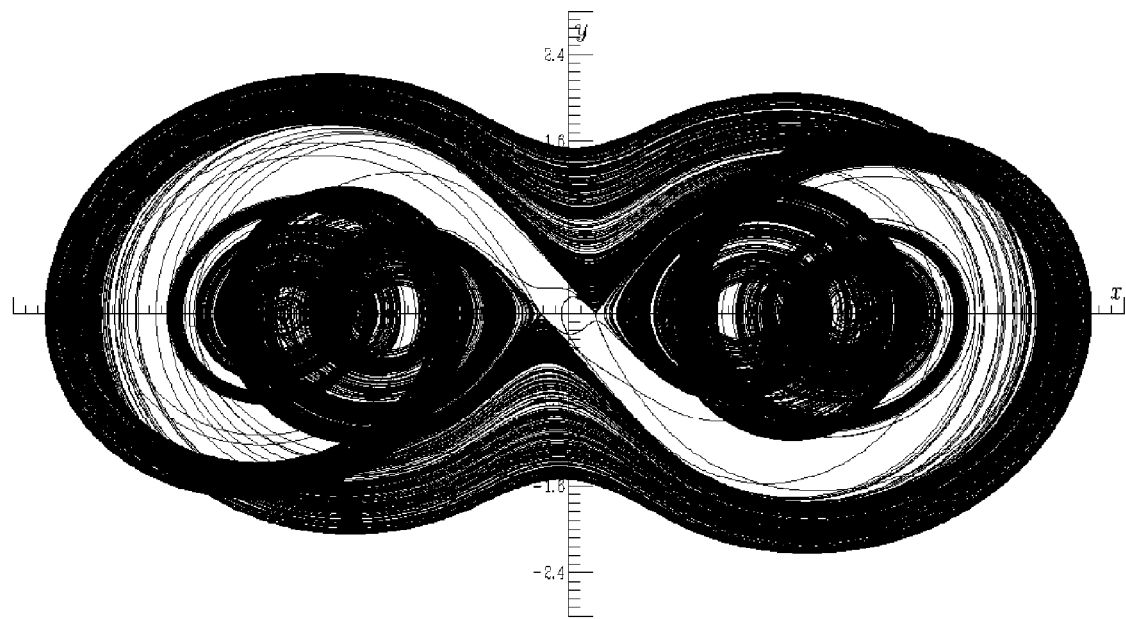

The equations in 11 generate chaos for different set of parameters. For example, the chaotic attractor shown in FIG. 24 is obtained from the numerical analysis of the system with $c_0=1.5$, $\alpha=2.67$, $\beta=3.38$, $\omega=0.33$, $b_0=0.9$, $\epsilon=0.1$ using a $4^{th}$-order Runge-Kutta algorithm with an adaptive step size.

Proposed chaotic oscillators offer some considerable advantages over the existing oscillators. Both of the circuits employ a differential pair to realize the required nonlinearity, which is the most widely used basic analog building block due to its high IC performance. The resistors employed in the circuits have very small values, so they can be effectively realized on IC. Moreover, the proposed chaotic oscillators are balanced; hence they offer better power supply rejection and noise immunity. Finally, the external source used to drive the circuits is a periodical pulse train, which can be accurately and easily realized using the clock signal already available on chip.

12 Mechanism of Chaos Generation

It is known that Melnikov's conditions can be used to show the existence of horseshoes in nearly Hamiltonian forced planar dissipative systems. According to the Smale-Birkhoff Theorem, for a given planar perturbed nonlinear system of the form, $\dot{x}=f(x)+\mu g(x,t)$, where f and g are smooth functions and g is periodic in time with a period of $T_\gamma$, if the following conditions are satisfied:

1. For $\mu=0$, the system is Hamiltonian and has a homoclinic orbit passing through the saddle-type critical point,
2. For $\mu=0$, the system has one parameter family of Periodic orbits $\theta_\gamma(t)$ of period $T_\gamma$ on the interior of the homoclinic orbit with, $\partial\theta_\gamma(0)/\partial\gamma\neq 0$,
3. For $t_0\in[0,T]$ The Meinikov function in Eq. 12 has simple zeros, $$M(t_0) = \int_{-\infty}^{+\infty} f^0(\tau) \wedge g^0(\tau+t_0)d\tau \qquad (12)$$

then the system has chaotic motions and horseshoes.

Figure 25:
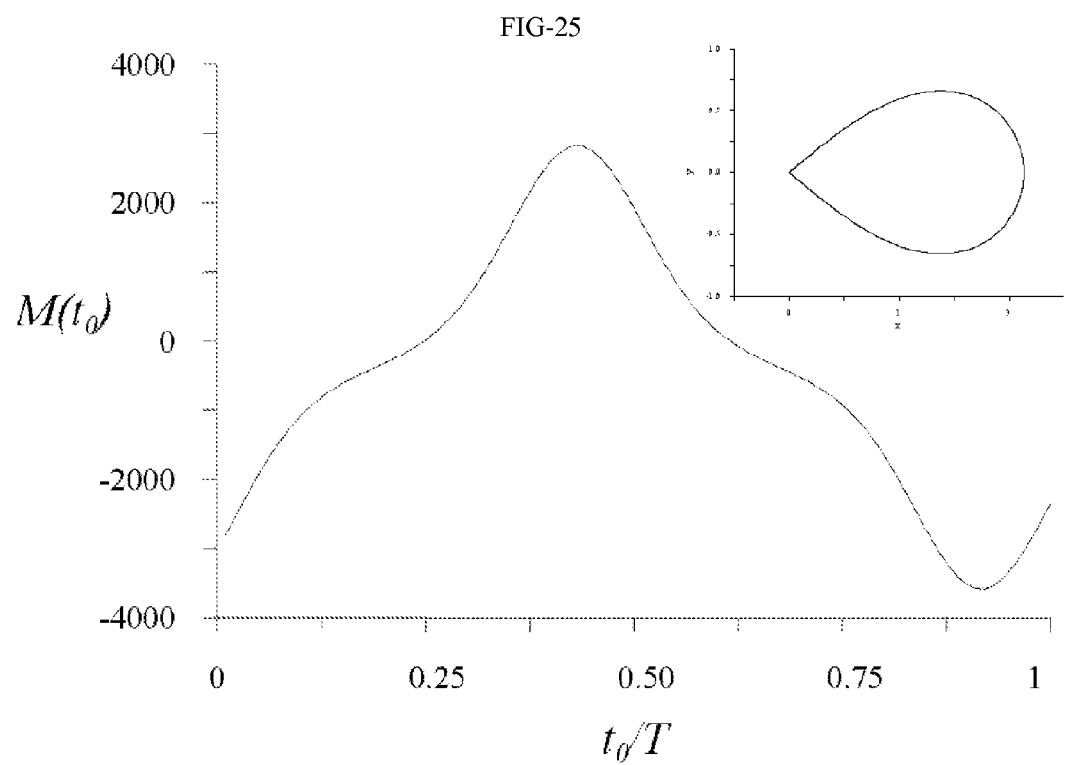

It is easy to verify that for $\epsilon=0$ (the parasitic capacitances are neglected), the system in Eqn. 9 can be written as follows:

$$\begin{bmatrix}\dot{x}\\\dot{y}\end{bmatrix} = \begin{bmatrix}-y\\x-\alpha\tanh x\end{bmatrix} + \mu\begin{bmatrix}0\\-y-\alpha x_p(t)\end{bmatrix} \qquad (13)$$

where $x_p(t)$ sgn($\sin(\omega t)$), $\alpha=c_0/(\alpha+\beta)$ and $\mu=1/(\alpha+\beta)$. In this ease, one can easily verify that the unperturbed system obtained for $=0$ has a saddle type critical point at the origin for $a>1$. Also, the unperturbed system is Hamiltonian and has a homoclinic orbit passing through the critical point. After replacing the non-smooth function $x_p(t)$ sgn($\sin(wtt)$) with its smooth approximation $x_p(t)=\tan h(10 \sin(\omega t))$, we have numerically calculated the Melnikov Function given in Equation 14:

$$M(t_0) = \int_{-\infty}^{+\infty} -y^0(y^0 + \alpha x_p(t+t_0))d\tau \qquad (14)$$

on the homoclinic orbit of Equation 13 shown in the upper right corner of FIG. 25. As shown in FIG. 25, we have verified that the Melnikov Function has simple zeros for $t_0\in[0,T]$ and the system in Equation 13 has chaotic motions and horseshoes. Numerical analysis of the system shows that the system remains chaotic for nonzero and small $\epsilon$ values. For example, the largest Lyapunov exponent of the system is found as 0.9 for $\epsilon=0.27$.

13 Random Bit Generation

In order to obtain random binary data from an autonomous chaotic system, an interesting technique has been presented, which relies on generating a non-invertible binary data from the waveform of the given chaotic system. It should be noted that non-invertibility is a key feature for generating PRNGs. Note that, although 2-dimensional section in the x-y plane is invertible, one may obtain a non-invertible map by considering only the values corresponding to one of the states, say x. In the proposed RNG, dual oscillator architecture is used with the proposed chaotic oscillators. In this design, the output of a fast oscillator is sampled on the rising edge of the chaos-modulated slower clock using a D flip-flop. A voltage-controlled oscillator (VCO) is used to implement the modulation of the slower clock frequency with the chaotic oscillator output signal x. Center frequency of the VCO determines the center frequency of the slower clock. Drift between the two oscillators provides random bit generation to be more robust. Because of the nonlinear aliasing phenomenon associated with Sampling, the dual oscillator architecture achieves increased output throughput and higher statistical quality. It has been reported that in order to obtain an uncorrelated random bit stream, the modulated slower oscillator period should feature a standard deviation much greater than the fast oscillator period. Though we have not numerically analyzed the dual oscillator architecture, we have experimentally verified that the binary data, obtained by this oscillator sampling technique, pass the tests of full NIST test suite without Von Neumann processing for a higher throughput speed.

14 Experimental Verification

Due to the lack of access to a suitable fabrication facility, we have chosen to construct the proposed chaotic oscillator circuits using discrete components in order to show the feasibility of the circuits. Both of the bipolar and CMOS circuits were biased with a single 5V power supply and the external signal $v_p(t)$ was generated by a square-wave generator.

The passive component values of the bipolar oscillator were L=10 mH, C=10 nF, R=180Ω, $R_p$=120Ω and $I_0$=1.2 mA. In FIG. 21, the bipolar transistors and the current source denoted byte, which was realized using a simple current mirror, were implemented with CA3046 and CA3096 NPN and PNP transistor arrays. Amplitude of $v_p(t)$ was 26 mV. We have experimentally verified that the proposed bipolar circuit had chaotic motions for the following frequency values of $v_p(t)$ (5.95 KHz, 6.23 KHz, 7.12 KHz, 13.03 KHz, 14.48 KHz, 14.91 MHz, 17.07 MHz, 17.23 KHz, 18.08 KHz).

The passive component values of the CMOS oscillator were: L=10 mH, C=10 nF, R=340Ω, $R_p$=430Ω and $I_0$=0.5 mA. In FIG. 23, the CMOS transistors and the current source denoted by Io, which was realized using a simple current mirror, were implemented with LM4007 CMOS transistor arrays. Amplitude of $v_p(t)$ was 383 mV. We have experimentally verified that the proposed CMOS circuit had chaotic motions for the following frequency values of $v_p(t)$ (5.95 KHz, 10 KHz, 11.1 KHz, 12.6 KHz).

Figure 26:
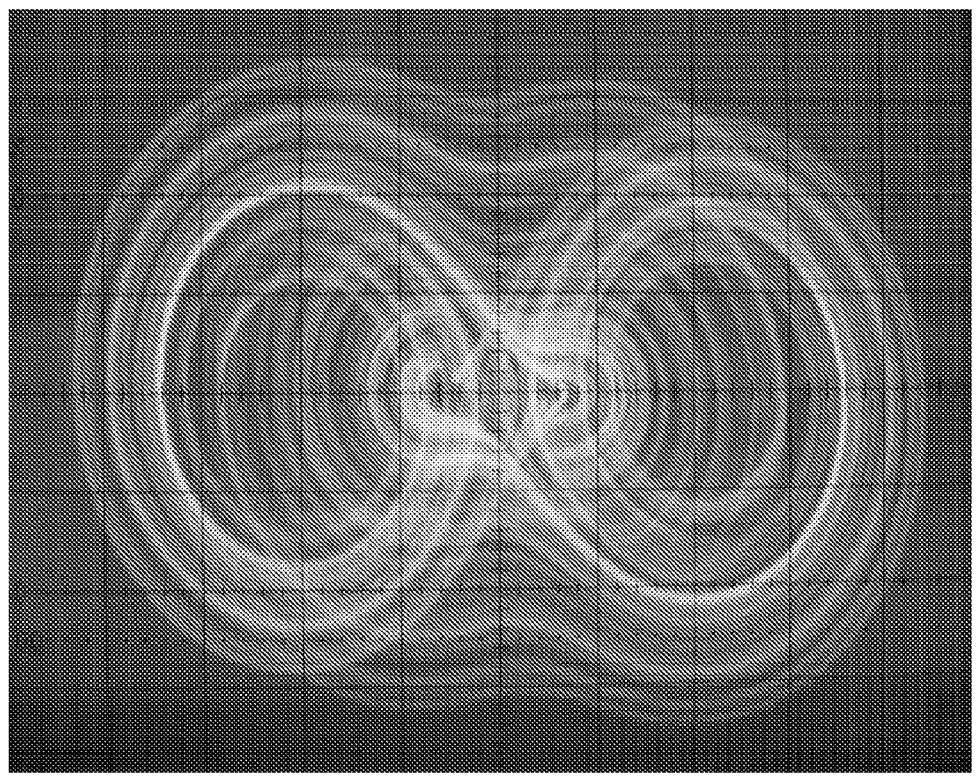
Figure 27:
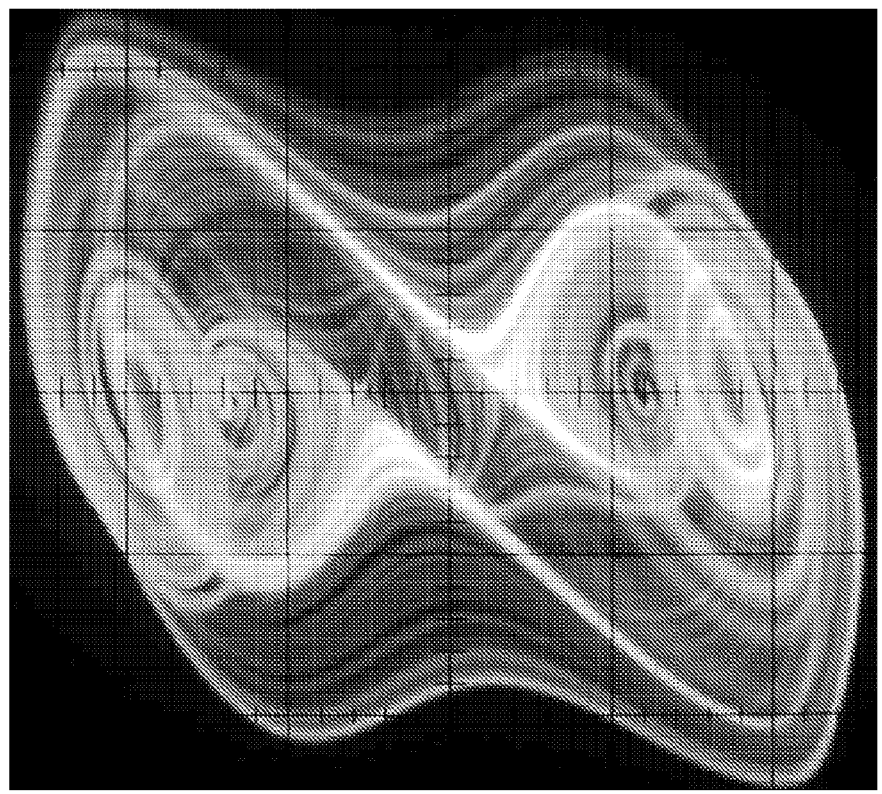

For both bipolar and CMOS oscillators, the frequency of $v_p(t)$ was adjusted to a low frequency value as 5.95 KHz on purpose to provide the circuits not to be affected by parasitic capacitances. The observed attractors are shown in FIG. 26 and FIG. 27 for the bipolar and CMOS oscillators, respectively.

15 Hardware Realization of RNG

We have generated random bits by using dual oscillator architecture with the proposed chaotic oscillators as shown in FIG. 5. In this circuit, according to the procedure above, 74HCT4046A VCO is used to implement the modulation of the slower clock frequency with the voltage $v_1$, which corresponds to the variable x. Center frequency of the VCO determines the center frequency of the slower clock.

An FPGA based hardware, which has a PCI interface was designed to upload the binary data to the computer. Maximum data storage rate of our FPGA based hardware is 62 Mbps. In order to remove the biasing of the output bit sequence, fast oscillator should have a balanced duty cycle. To get a satisfactory result, fast oscillator is implemented by dividing a low jitter 152 MHz crystal oscillator by N=8 inside the FPGA. In this way, we get a 19 MHz fast oscillator that has a guaranteed 50% duty cycle.

Figure 28:
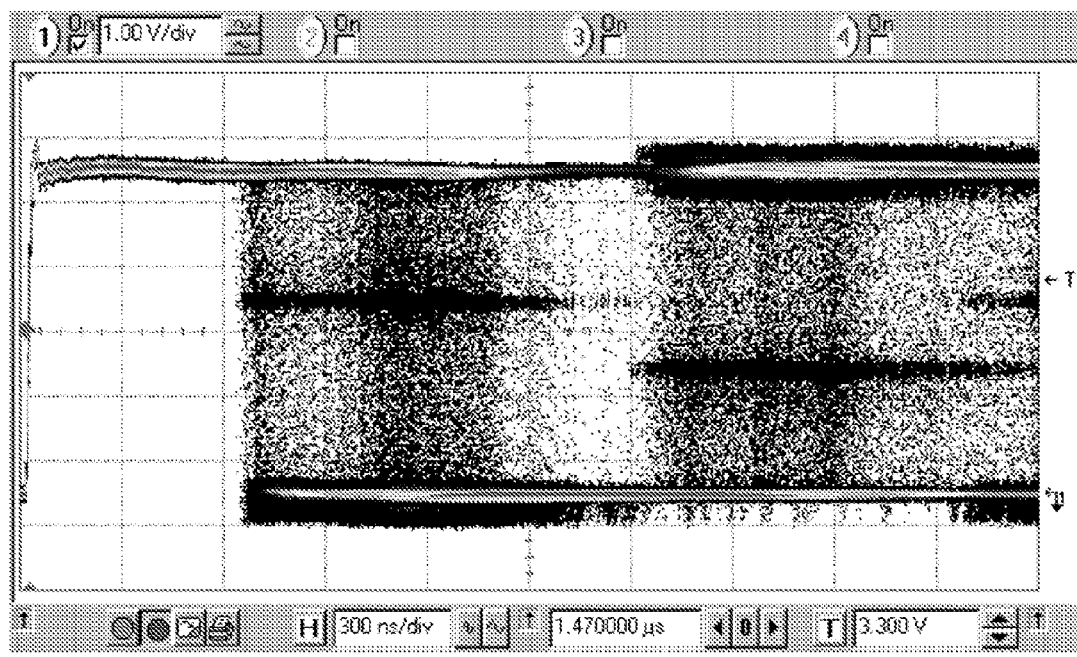

The slow and fast oscillators may have center frequency ratios on the order of 1:100. In our design, we experimentally get successful results from the full NIST test suite when the slower clock frequency is adjusted up to 1.81 MHz. Then, 19 MHz fast oscillator is sampled on the rising edge of the slower clock using a D flip-flop inside the FPGA. High jitter level achieved by chaos-modulated oscillator for CMOS circuit is shown in FIG. 28. The measured minimum period 610.927 ns and the maximum period 1001.024 ns feature a standard deviation much greater than the fast oscillator period, thus provides uncorrelated random bit stream out.

Moreover, for both bipolar and CMOS circuits, a bit stream of length 4.83 GBytes was acquired through the PCI interface of the FPGA based hardware without Von Neumann processing. The obtained bits were subjected to full NIST test suite. For different frequency values of $v_p(t)$ from 5.95 KHz to 18.08 KHz for the bipolar circuit and from 5.95 KHcz to 12.6 KHz for the CMOS circuit where the proposed oscillators generate chaos as mentioned before, we have experimentally verified that the binary data obtained by this oscillator sampling technique pass the tests of full NIST test suite. The pass rates of the tests are approximately the same for the given frequency values of $v_p(t)$.

The frequency of $v_p(t)$ is adjusted to 5.95 KHz. The test results of the CMOS circuit are given in Table 3 for three different frequency values of the slower oscillator when the frequency of the fast oscillator is 19 MHz. The slower clock frequency, which determines the throughput data rate is basically limited by the frequency of voltage v1 and can be adjusted up to 1.81 MHz as shown in Table 3. If a balanced duty cycle can be guaranteed, the fast oscillator frequency should be increased.

As a result Bipolar & CMOS, two novel continuous-time chaotic oscillators suitable for IC realization and novel TRNGs based on these oscillators were presented. Experimental results presented in this section not only verify the feasibility of the proposed circuits, but also encourage their use as the core of a high-performance IC TRNG as well. In conclusion, we have experimentally verified that, when the frequency of the external periodical pulse signal is adjusted to 5.95 KHz, the throughput data rates of regional sequences is 1.81 Mbps without Von Neumann processing. Finally we have experimentally verified that, for both bipolar and CMOS circuits, the binary data obtained by this oscillator sampling technique passed the tests of full NIST test suite without Von Neumann processing for a higher throughput speed while compared with the TRNG design where the proposed continuous-time chaotic oscillators are used alone.

TABLE 3

Results of the NIST test suite for RNG using dual oscillator architecture with a non-autonomous chaotic oscillator.

| STATISTICAL TESTS | $f_{slowoscillator}$ | | |
| --- | --- | --- | --- |
| | 1.58 MHz | 1.81 MHz | 1.94 MHz |
| Frequency | 0.9931 | 1.0000 | 0.9940 |
| Block Frequency | 0.9946 | 0.9881 | 0.9791 |
| Cumulative Sums | 0.9911 | 0.9985 | 0.9925 |
| Runs | 0.9839 | 0.9940 | x |
| Longest Run | 0.9821 | 0.9881 | 0.9851 |
| Rank | 0.9925 | 0.9910 | 0.9910 |
| FFT | 0.9991 | 1.0000 | 0.9940 |
| Nonperiodic Templates | 0.9882 | 0.9882 | 0.9802 |

TABLE 3-continued

Results of the NIST test suite for RNG using dual oscillator architecture with a non-autonomous chaotic oscillator.

| STATISTICAL TESTS | $f_{slowoscillator}$ | | |
|---|---|---|---|
| | 1.58 MHz | 1.81 MHz | 1.94 MHz |
| Overlapping Templates | 0.9848 | 0.9851 | 0.9433 |
| Universal | 1.0000 | 0.9970 | 0.9851 |
| Apen | 0.9779 | 0.9821 | x |
| Random Excursions | 0.9874 | 0.9870 | 0.9902 |
| Random Excursions Variant | 0.9906 | 0.9897 | 0.9880 |
| Serial | 0.9870 | 0.9746 | 0.9865 |
| Lempel Ziv | 0.9797 | 0.9821 | 0.9851 |
| Linear Complexity | 0.9869 | 0.9881 | 0.9821 |

($f_{vp(t)}$ = 5.95 KHz, $f_{fastoscillator}$ = 19 MHz)

The invention claimed is:

1. A method for generating binary random bits ($S_{(DOA)i}$) based on a dual oscillator architecture with a continuous-time chaotic oscillator and relying on generating non-invertible random binary bits from one state which corresponds to one signal of the continuous-time chaotic oscillator, the method comprising:

obtaining $x_{1j}$, $x_{2j}$, ... or $x_{nj}$ values at rising edges of an external periodical pulse signal by using one of a plurality of states $x_1$, $x_2$, ... or $x_n$ of the continuous-time chaotic oscillator at times t satisfying $f_s H (x_{1(f)}, x_{2(f)}, \ldots$ or $x_{n(f)})$t mod $2\pi$=0, where $f_s$ is a center frequency of a slower clock and $f_s H(\ )$ is a transfer function of a voltage-controlled oscillator (VCO) or a current-controlled oscillator (CCO);

obtaining the slower clock periods $T_{slow1j}$, $T_{slow2j}$, ... or $T_{slownj}$ values by $1/(f_s H (x_{1j}, x_{2j}, \ldots$ or $x_{nj}))$;

obtaining a sum of the slower clock periods $T_{slow1j}$, $T_{slow2j}$, ... or $T_{slownj}$ values from j=1 to j=i;

dividing the sum of the slower clock periods to $T_{fast}/2$ where $T_{fast}$ is the period of the fast clock;

performing mod 2 (modulo 2 operator) operation on the obtained division result of the sum of the slower clock periods; and generating a random binary sequence $S_{(DOA)i}$, which is the logical inverse of the mod 2 operation result, or $S_{(DOA)i}$, by $S_{(DOA)i}=S_{(DOA)(i-1)}$, if the logical inverse of the mod 2 operation result is 0, and $S_{(DOA)i}$=the logical inverse of $S_{(DOA)(i-1)}$, if the logical inverse of the mod 2 operation result is 1.

2. A random bit generator which is based on a dual oscillator architecture with a continuous-time chaotic oscillator and which relies on generating non-invertible random binary bits from one signal of the continuous-time chaotic oscillator, the random bit generator comprising:

a chaos-modulated slower clock where a voltage-controlled oscillator (VCO) or a current-controlled oscillator (CCO) is used to implement the modulation of a slower clock frequency with the one corresponding to one of a plurality of states ($x_1$, $x_2$, ... or $x_n$), of the continuous time chaotic oscillator, wherein a center frequency of the VCO or the CCO determines a center frequency of the slower clock;

a fast clock having a 50% duty cycle which is implemented by dividing a low jitter oscillator inside hardware of the chaotic oscillator, wherein a frequency ratio of fast and slower clocks is at least 200; and a D type flip-flop (D flip-flop) or a T type flip-flop (T flip-flop) in order to generate a binary sequence ($S_{(DOA)}$) by sampling an output of a fast oscillator at rising or falling edges of the chaos-modulated slower clock.

3. A method for generating binary random bits ($S_{(CDOA)i}$) based on a dual oscillator architecture with a continuous-time chaotic oscillator and relying, on generating non-invertible random binary bits from one state which corresponds to one signal of the continuous-time chaotic oscillator, the method comprising:

determining sampling times appointed at a status transition of one state $x_1$, $x_2$, ... or $x_n$ of the continuous-time chaotic oscillator defined as $x_1 \ldots n(t)=x_1 \ldots n(0)$ with $dx_{1 \ldots n}$=dt>0 or $dx_{1 \ldots n}$=dt<0; and generating a random binary sequence $S_{(CDOA)i}$ by sampling an output of a fast oscillator at sampling times corresponding to the status transition of the one state, or $S_{(CDOA)i}$, by $S_{(CDOA)i}=S_{(CDOA)(i-1)}$, if a bit, sampled from the output of the fast oscillator at the sampling times corresponding to status transition of the one state, is 0, and $S_{(CDOA)i}$=the logical inverse of $S_{(CDOA)(i-1)}$, if the bit sampled from the output of the fast oscillator at the sampling times corresponding to status transition of the one state, is 1.

4. Hardware for generating binary random bits based on a dual oscillator architecture with a continuous-time chaotic oscillator, the hardware comprising:

a comparator instead of a chaos-modulated slower clock where one signal, which corresponds to one of a plurality of states ($x_1$, $x_2$, ... or $x_n$), of the continuous time chaotic oscillator is compared with a threshold voltage;

a fast clock having a 50% duty cycle which is implemented by dividing a low jitter oscillator inside the hardware; and a D type flip-flop (D flip-flop) or a T type flip-flop (T flip-flop) in order to generate a binary sequence ($S_{(CDOA)}$) by sampling an output of a fast oscillator at rising and/or falling edges of the comparator output.

5. A method for generating binary random bits ($S_{(CDOA)i}$) based on a dual oscillator architecture with a noise source and relying on generating non-invertible random binary bits from a random signal obtained from a noise source, the method comprising:

determining sampling times appointed at a status transition of a random signal x obtained from the noise source defined as x(t)=x(0) with dx=dt>0 or dx/dt<0;

generating a random binary sequence $S_{(CDOA)i}$ by sampling an output of a fast oscillator at the sampling times corresponding to the status transition of the random signal, or $S_{(CDOA)i}$, by $S_{(CDOA)i}=S_{(CDOA)(i-1)}$, if a bit, sampled from the output of the fast oscillator at the sampling times corresponding to the status transition of the random signal, is 0, and $S_{(CDOA)i}$=the logical inverse of $S_{(CDOA)(i-1)}$, if the bit sampled from the output of the fast oscillator at the sampling times corresponding to the status transition of the random signal, is 1.

6. Hardware for generating binary random bits based on a dual oscillator architecture with a noise source, the hardware comprising:

a comparator instead of a jittered slower clock where a noise voltage obtained from the noise source is compared with a threshold voltage;

a fast clock having a 50% duty cycle which is implemented by dividing a low jitter oscillator inside the hardware; and (c) a D type flip-flop (D flip-flop) or a T type flip-flop (T flip-flop) in order to generate a binary sequence ($S_{(CDOA)}$) by sampling an output of a fast oscillator at rising and/or falling edges of the comparator output.

* * * * *